United States Patent
Feffer et al.

(10) Patent No.: US 12,246,490 B2
(45) Date of Patent: Mar. 11, 2025

(54) METHOD AND SYSTEM FOR ADDITIVE MANUFACTURING USING CLOSED-LOOP TEMPERATURE CONTROL

(71) Applicant: Stratasys Ltd., Rehovot (IL)

(72) Inventors: Amit Feffer, Ramat HaSharon (IL); Gil Shelef, Kibbutz Negba (IL); Haim Rotfeld, Mazkeret Batya (IL); David Prizant, Kfar Achim (IL)

(73) Assignee: Stratasys Ltd., Rehovot (IL)

( * ) Notice: Subject to any disclaimer, the term of this patent is extended or adjusted under 35 U.S.C. 154(b) by 0 days.

(21) Appl. No.: 17/847,284

(22) Filed: Jun. 23, 2022

(65) Prior Publication Data
US 2022/0324178 A1    Oct. 13, 2022

Related U.S. Application Data

(63) Continuation of application No. 17/280,282, filed as application No. PCT/IL2019/051072 on Sep. 27, 2019, now Pat. No. 11,413,826.
(Continued)

(51) Int. Cl.
*B29C 64/393* (2017.01)
*B28B 1/00* (2006.01)
(Continued)

(52) U.S. Cl.
CPC ............ *B29C 64/393* (2017.08); *B28B 1/001* (2013.01); *B28B 17/0081* (2013.01);
(Continued)

(58) Field of Classification Search
CPC ... B28B 17/0081; B28B 1/001; B29C 64/364; B29C 64/393; B29C 64/209; B33Y 10/00; B33Y 30/00; B33Y 40/00; B33Y 50/02
See application file for complete search history.

(56) References Cited

U.S. PATENT DOCUMENTS

| | | |
|---|---|---|
| 6,259,962 B1 | 7/2001 | Gothait |
| 6,569,373 B2 | 5/2003 | Napadensky |

(Continued)

FOREIGN PATENT DOCUMENTS

| | | |
|---|---|---|
| CN | 103384591 | 11/2013 |
| GB | 2507953 | 5/2014 |

(Continued)

OTHER PUBLICATIONS

M. Saini and R .L. Webb, "Heat rejection limits of air cooled plane fin heat sinks for computer cooling," [Therm2002. EighthIntersocietyConferenceonThermalandThermomechanicalPhenomenainElectronicSystems,SanDiego,CA,USA,2002,pp. 1-8. Accessedfromieeexplore.ieee.orgonJul. 2, 2024 (Year: 2002).*

(Continued)

*Primary Examiner* — Jamel M Nelson

(57) ABSTRACT

A system for additive manufacturing comprises a dispensing head for dispensing building materials on a working surface, a hardening system for hardening the building materials, a cooling system for evacuating heat away from the building materials, and a computerized controller. A thermal sensing system is mounted above the working surface in a manner that allows relative motion between the sensing system and the working surface, and is configured to generate sensing signals responsively to thermal energy sensed thereby. The controller controls the dispensing head to dispense the building materials in layers, the sensing system to generate the sensing signals only when the sensing system is above the building materials once hardened, and the heat evacuation rate of the cooling system responsively to the sensing signals.

23 Claims, 14 Drawing Sheets

Related U.S. Application Data

(60) Provisional application No. 62/737,172, filed on Sep. 27, 2018.

(51) Int. Cl.
  *B28B 17/00* (2006.01)
  *B29C 64/112* (2017.01)
  *B29C 64/364* (2017.01)
  *B33Y 10/00* (2015.01)
  *B33Y 30/00* (2015.01)
  *B33Y 40/00* (2020.01)
  *B33Y 50/02* (2015.01)

(52) U.S. Cl.
  CPC .......... *B29C 64/112* (2017.08); *B29C 64/364* (2017.08); *B33Y 10/00* (2014.12); *B33Y 30/00* (2014.12); *B33Y 40/00* (2014.12); *B33Y 50/02* (2014.12)

(56) References Cited

U.S. PATENT DOCUMENTS

| | | |
|---|---|---|
| 6,658,314 B1 | 12/2003 | Gothait |
| 6,850,334 B1 | 2/2005 | Gothait |
| 6,863,859 B2 | 3/2005 | Levy |
| 7,183,335 B2 | 2/2007 | Napadensky |
| 7,209,797 B2 | 4/2007 | Kritchman et al. |
| 7,225,045 B2 | 5/2007 | Gothait et al. |
| 7,300,619 B2 | 11/2007 | Napadensky et al. |
| 7,500,846 B2 | 3/2009 | Eshed et al. |
| 7,991,498 B2 | 8/2011 | Kritchman |
| 9,031,680 B2 | 5/2015 | Napadensky |
| 2006/0054039 A1* | 3/2006 | Kritchman ............... B29C 48/92 427/256 |
| 2007/0179656 A1* | 8/2007 | Eshed .................... B33Y 70/00 700/119 |
| 2015/0183162 A1 | 7/2015 | Kuk et al. |
| 2016/0279872 A1 | 9/2016 | Paternoster |
| 2016/0297145 A1 | 10/2016 | Kanda |
| 2016/0332379 A1 | 11/2016 | Paternoster et al. |
| 2016/0339643 A1 | 11/2016 | Dikovsky et al. |
| 2017/0072463 A1 | 3/2017 | Ng et al. |
| 2017/0072626 A1 | 3/2017 | McConville et al. |
| 2018/0029291 A1 | 2/2018 | Matzner et al. |
| 2018/0111334 A1 | 4/2018 | Gold et al. |
| 2018/0215092 A1 | 8/2018 | Dudley et al. |
| 2021/0308951 A1 | 10/2021 | Feffer et al. |

FOREIGN PATENT DOCUMENTS

| | | | |
|---|---|---|---|
| GB | 2550339 | 11/2017 | |
| GB | 2550339 A * | 11/2017 | ........... B29C 64/165 |
| JP | 2003-74946 | 3/2003 | |
| JP | 2015-501369 | 1/2015 | |
| JP | 2016-087832 | 5/2016 | |
| JP | 2016-179584 | 10/2016 | |
| JP | 2016-185618 | 10/2016 | |
| JP | 2017-43041 | 3/2017 | |
| JP | 2017-056724 | 3/2017 | |
| WO | WO 2020/065657 | 4/2020 | |

OTHER PUBLICATIONS

English Summary Dated Feb. 7, 2023 of Notification of Office Action and Search Report Dated Jan. 11, 2023 From the State Intellectual Property Office of the People's Republic of China Re. Application No. 201980060598.4. (7 Pages).
Notice of Reason(s) for Rejection Dated Mar. 25, 2016 From the Japan Patent Office Re. Application No. 2021-512521. (6 pages).
Notification of Office Action and Search Report Dated Jan. 11, 2023 From the State Intellectual Property Office of the People's Republic of China Re. Application No. 201980060598.4. (17 Pages).
English Summary Dated May 20, 2022 of Notification of Office Action and Search Report Dated Apr. 28, 2022From the State Intellectual Property Office of the People's Republic of China Re. Application No. 201980060598.4. (3 Pages).
International Preliminary Report on Patentability Dated Apr. 8, 2021 From the International Bureau of WIPO Re. Application No. PCT/IL2019/051072. (14 Pages).
International Search Report and the Written Opinion Dated Mar. 13, 2020 From the International Searching Authority Re. Application No. PCT/IL2019/051072. (21 Pages).
Invitation to Pay Additional Fees, Communication Relating to the Results of the Partial International Search and the Provisional Opinion Dated Jan. 15, 2020 From the International Searching Authority Re. Application No. PCT/IL2019/051072. (14 Pages).
Notice of Allowance Dated Apr. 4, 2022 from US Patent and Trademark Office Re. U.S. Appl. No. 17/280,282. (7 pages).
Notification of Office Action and Search Report Dated Apr. 28, 2022From the State Intellectual Property Office of the People's Republic of China Re. Application No. 201980060598.4. (15 Pages).
Official Action Dated Oct. 12, 2021 from the US Patent and Trademark Office Re. U.S. Appl. No. 17/280,282. (12 pages).
Restriction Official Action Dated Aug. 9, 2021 from the US Patent and Trademark Office Re. U.S. Appl. No. 17/280,282. (7 pages).
Translation Dated Nov. 8, 2022 of Notice of Reason for Rejection Dated Oct. 4, 2022 From the Japan Patent Office Re. Application No. 2021-512521.(4 pages).
Summary of Notification of Office Action and Search Report Dated May 11, 2023 From the State Intellectual Property Office of the People's Republic of China Re. Application No. 201980060598.4. (9 Pages).
Notification of Office Action and Search Report Dated May 11, 2023 From the State Intellectual Property Office of the People's Republic of China Re. Application No. 201980060598.4. (15 Pages).
English Summary and Machine Translation Dated Sep. 21, 2023 of Decision on Rejection Dated Aug. 28, 2023 From the State Intellectual Property Office of the People's Republic of China Re. Application No. 201980060598.4. (40 pages).
Decision on Rejection Dated Aug. 28, 2023 From the State Intellectual Property Office of the People's Republic of China Re. Application No. 201980060598.4. (11 Pages).
Supplementary European Search Report and the European Search Opinion Dated Oct. 18, 2023 From the European Patent Office Re. Application No. 23186200.4. (7 Pages).

\* cited by examiner

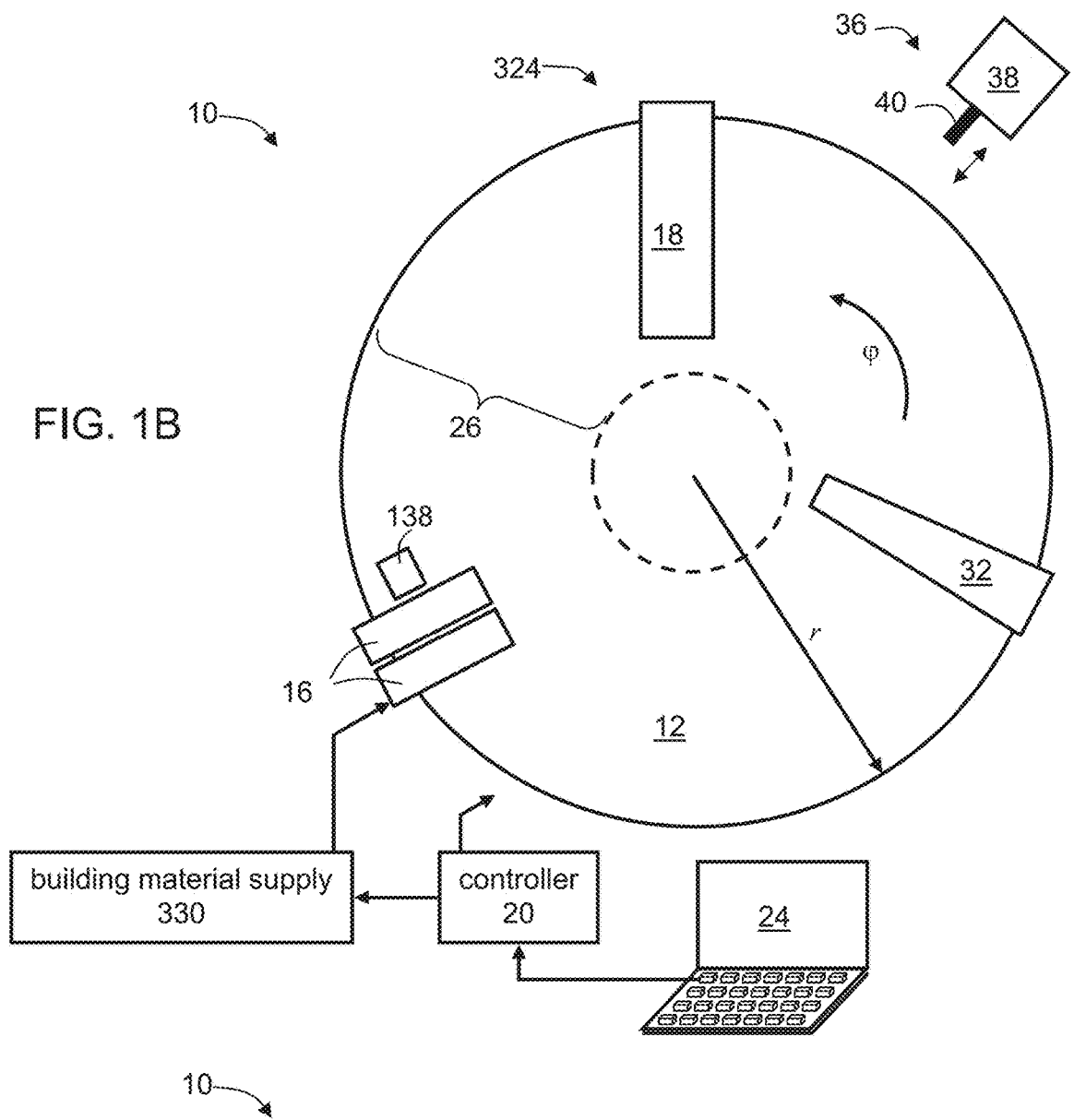
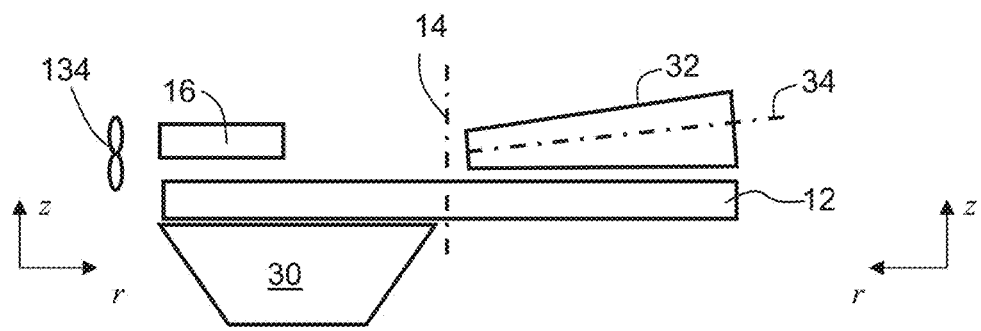

METHOD AND SYSTEM FOR ADDITIVE MANUFACTURING USING CLOSED-LOOP TEMPERATURE CONTROL

RELATED APPLICATIONS

This application is a Continuation of U.S. patent application Ser. No. 17/280,282 filed on Mar. 26, 2021, which is a National Phase of PCT Patent Application No. PCT/IL2019/051072 having International Filing Date of Sep. 27, 2019, which claims the benefit of priority under USC § 119(e) of U.S. Provisional Patent Application No. 62/737,172 filed on Sep. 27, 2018. The contents of the above applications are all incorporated by reference as if fully set forth herein in their entirety.

FIELD AND BACKGROUND OF THE INVENTION

The present invention, in some embodiments thereof, relates to additive manufacturing and, more particularly, but not exclusively, to method and system for additive manufacturing using closed-loop temperature control.

Additive manufacturing (AM) is a technology enabling fabrication of arbitrarily shaped structures directly from computer data via additive formation steps. The basic operation of any AM system consists of slicing a three-dimensional computer model into thin cross sections, translating the result into two-dimensional position data and feeding the data to control equipment, which fabricates a three-dimensional structure in a layerwise manner.

Additive manufacturing entails many different approaches to the method of fabrication, including three-dimensional (3D) printing such as 3D inkjet printing, electron beam melting, stereolithography, selective laser sintering, laminated object manufacturing, fused deposition modeling and others.

Some 3D printing processes, for example, 3D inkjet printing, are being performed by a layer by layer inkjet deposition of building materials. Thus, a building material is dispensed from a dispensing head having a set of nozzles to deposit layers on a supporting structure. Depending on the building material, the layers may then be cured or solidified using a suitable device.

Various three-dimensional printing techniques exist and are disclosed in, e.g., U.S. Pat. Nos. 6,259,962, 6,569,373, 6,658,314, 6,850,334, 6,863,859, 7,183,335, 7,209,797, 7,225,045, 7,300,619, 7,500,846, 7,991,498 and 9,031,680 and U.S. Published Application Nos. 20160339643 and 20060054039, all by the same Assignee, and being hereby incorporated by reference in their entirety.

U.S. Published Application No. 20060054039 discloses a printing cell for three-dimensional printing of modeling material on a tray to form an object. The printing cell includes a temperature control unit. The control unit includes a heating source and a cooling source, and is associated with a temperature sensing unit to sense the temperature of the printing cell, the tray, and the building material.

SUMMARY OF THE INVENTION

According to an aspect of some embodiments of the present invention there is provided a system for additive manufacturing. The system comprises: a dispensing head for dispensing building materials on a working surface; a hardening system for hardening the building materials; a cooling system for evacuating heat away from the building materials; a thermal sensing system, mounted above the working surface in a manner that allows relative motion between the sensing system and the working surface, and being configured to generate sensing signals responsively to thermal energy sensed thereby; and a computerized controller having a circuit for controlling the dispensing heads to dispense the building materials in layers, a circuit for controlling the sensing system to generate the sensing signals only when the sensing system is above the building materials once hardened, and a circuit for controlling a heat evacuation rate of the cooling system responsively to the sensing signals.

According to some embodiments of the invention the thermal sensing system comprises at least one pixelated sensor, wherein the sensing signals constitutes a thermal map of the hardened building materials.

According to some embodiments of the invention the circuit for controlling the heat evacuation rate is configured to identify in the thermal map a first pixel population of a higher temperature and a second pixel population of a lower temperature, and to control the heat evacuation rate based on the first and the second population.

According to some embodiments of the invention the circuit for controlling the heat evacuation rate is configured to control the heat evacuation rate so as to maintain the first pixel population at a temperature that is below a first predetermined threshold.

According to some embodiments of the invention, the circuit for controlling the heat evacuation rate is configured to control the heat evacuation rate so as to maintain the second pixel population at a temperature that is above a second predetermined threshold.

According to some embodiments of the invention, the dispensing head is mounted between the hardening system and the sensing system.

According to some embodiments of the invention the dispensing head comprises a nozzle array having a length and being arranged along an indexing direction, and wherein the sensing system is mounted at a distance from the working surface selected such that a field-of-view of the sensing system over the working surface along the indexing direction matches the length.

According to some embodiments of the invention the circuit for controlling the sensing system is configured to adapt a sampling rate of the signals to a speed of the relative motion.

According to some embodiments of the invention, the cooling system comprises a fan, and wherein the circuit for controlling the heat evacuation rate is configured to vary a rotating speed of the fan.

According to some embodiments of the invention the rotating speed of the fan is varied according to a function of a temperature difference between a temperature sensed by the sensing system and a predetermined temperature, the function comprises a quadratic function of the temperature difference.

According to an aspect of some embodiments of the present invention there is provided a method of additive manufacturing. The method comprises: dispensing building materials on a receiving surface; hardening the building materials to form hardened materials; sensing thermal energy emitted at least by the hardened building materials; evacuating heat away from the building materials responsively to thermal energy emitted by the hardened building materials, but not responsively to thermal energy emitted by other objects; and repeating the dispensing, the hardening, the sensing, and the evacuating a plurality of times to form a three-dimensional object in layers corresponding to slices of the object.

According to some embodiments of the invention, the sensing is by at least one pixelated sensor to provide a thermal map of the hardened building materials.

According to some embodiments of the invention the method comprises identifying in the thermal map a first pixel population of a higher temperature and a second pixel population of a lower temperature, wherein the evacuating the heat is at a rate selected based on the first and the second population.

According to some embodiments of the invention, the rate is selected so as to maintain the first pixel population at a temperature that is below a first predetermined threshold.

According to some embodiments of the invention rate is selected so as to maintain the second pixel population at a temperature that is above a second predetermined threshold.

According to some embodiments of the invention the method comprises the dispensing is by a dispensing head which comprises a nozzle array having a length and being arranged along an indexing direction, and wherein the sensing is characterized by a field-of-view over the hardened materials that matches the length.

According to some embodiments of the invention, the method comprises adapting a sampling rate of sensing to a speed of the relative motion.

According to some embodiments of the invention, the evacuating is by a fan, and the method comprises varying a rotating speed of the fan.

According to some embodiments of the invention the rotating speed of the fan is varied according to a function of a temperature difference between a temperature corresponding to the sensed thermal energy and a predetermined temperature, the function comprises a quadratic function of the temperature difference.

According to an aspect of some embodiments of the present invention there is provided a system for additive manufacturing. The system comprises: a dispensing head for dispensing building materials; a hardening system for hardening the building materials; a cooling system having a fan for evacuating heat away from the building materials; and a computerized controller having a circuit for controlling the dispensing heads to dispense the building materials in layers, the hardening system to harden the building materials, and the cooling system to evacuate heat away from the layers, wherein the circuit is configured to vary a rotating speed of the fan as a decreasing function of an area of a respective layer.

According to some embodiments of the invention for at least one of the layers, the dispensing heads dispense the building materials in more than one pass over a receiving surface, and wherein the circuit is configured to select the rotating speed of the fan based on a number of the passes.

According to some embodiments of the invention for at least one of the layers, the circuit is configured to control the hardening system to harden a portion of the layer following a dispensing of one type of building material to form the portion but before a dispensing of another type of building material to form another portion of the layer.

According to some embodiments of the invention, the circuit is configured to access a computer readable medium storing groups of building materials, to associate a respective building material with one of the groups, and to select the rotating speed also based on the association.

According to some embodiments of the invention the system comprises a thermal sensing system configured to sense a temperature of at least one of the layers, wherein the circuit is configured to receive temperature sensing signals from the sensing system and to select the rotating speed based on the temperature sensing signals.

According to an aspect of some embodiments of the present invention there is provided a system for additive manufacturing. The system comprises: a plurality of dispensing heads for dispensing a respective plurality of building materials; a hardening system for hardening the building materials; and a computerized controller having a circuit for controlling the dispensing heads to dispense the building materials in layers, and the hardening system to harden the building materials, wherein for at least one of the layers, the circuit is configured to control the hardening system to harden a first portion of the layer following a dispensing of one type of building material to form the first portion, but before a dispensing of another type of building material to form a second portion of the layer.

According to some embodiments of the invention, the hardening of the first portion is at a first temperature, and wherein the circuit is configured to control the hardening system to harden the second portion, at a second temperature, which is different than the first temperature.

According to some embodiments of the invention, the second temperature is higher than the first temperature.

According to some embodiments of the invention, the circuit is configured to access a computer readable medium storing groups of building materials, to associate a respective building material with one of the groups, and to select a respective hardening temperature based on the association.

According to some embodiments of the invention, the circuit is configured to transmit pulsed operating signals to the dispensing heads, in a manner that pulses of different widths are transmitted to different dispensing heads.

According to some embodiments of the invention, the circuit is configured to access a computer readable medium storing groups of building materials, to associate a respective building material with one of the groups, and to select a respective pulse width based on the association.

According to some embodiments of the invention the system comprises a heating system for heating an environment surrounding the layers, wherein the circuit is configured to access a computer readable medium storing groups of building materials, to associate a respective building material with one of the groups, and to select control of at least one of a power and operation duration of the heating system based on the association.

According to some embodiments of the invention the heating system comprises a heating radiation source generating heating radiation.

According to some embodiments of the invention the radiation is infrared radiation.

According to some embodiments of the invention, the circuit is configured to synchronize operation of the heating system with operation of the hardening system.

According to some embodiments of the invention the synchronization is such that the operation of the hardening system is initiated after the operation of the heating system is terminated.

According to an aspect of some embodiments of the present invention there is provided a method of additive manufacturing of an object, the method comprises: receiving computer object data defining a shape of the object; and operating the additive manufacturing system described herein according to the computer object data to manufacture the object.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A-1D are schematic illustrations of an additive manufacturing system according to some embodiments of the invention;

DESCRIPTION OF SPECIFIC EMBODIMENTS OF THE INVENTION

Figure 1A:
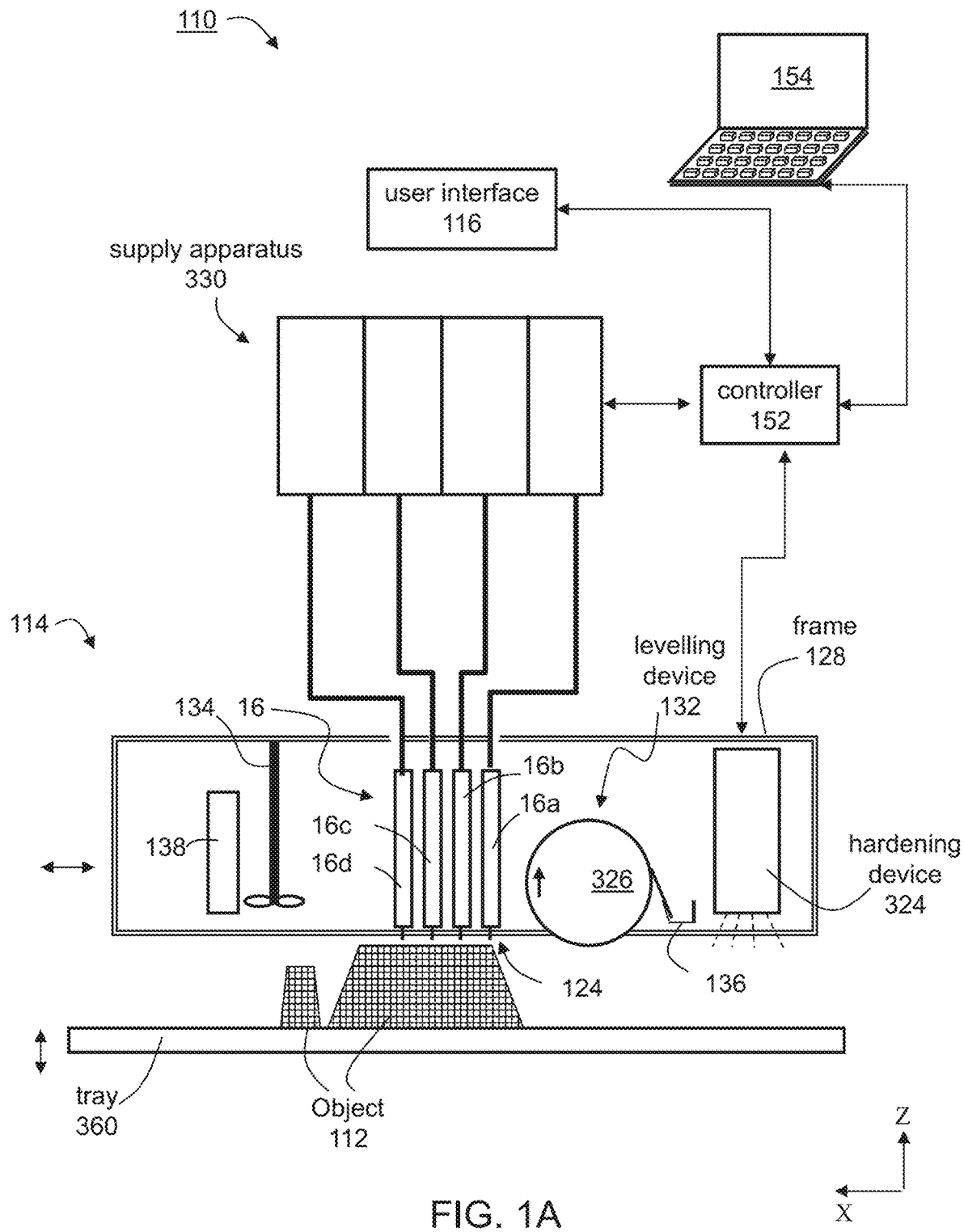

The present invention, in some embodiments thereof, relates to additive manufacturing and, more particularly, but not exclusively, to method and system for additive manufacturing using closed-loop temperature control.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof.

Each layer is formed by additive manufacturing apparatus, which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material formulation, and which type of building material formulation is to be delivered thereto. The decision is made according to a computer image of the surface.

In preferred embodiments of the present invention, the AM comprises three-dimensional printing, more preferably three-dimensional inkjet printing. In these embodiments a building material formulation is dispensed from a dispensing head having a set of nozzles to deposit building material formulation in layers on a supporting structure. The AM apparatus thus dispenses building material formulation in target locations, which are to be occupied and leaves other target locations void. The apparatus typically includes a plurality of dispensing heads, each of which can be configured to dispense a different building material formulation. Thus, different target locations can be occupied by different building material formulations. The types of building material formulations can be categorized into two major categories: modeling material formulation and support material formulation. The support material formulation serves as a supporting matrix or construction for supporting the object or object parts during the fabrication process and/or other purposes, e.g., providing hollow or porous objects. Support constructions may additionally include modeling material formulation elements, e.g. for further support strength.

The modeling material formulation is generally a composition which is formulated for use in additive manufacturing and which is able to form a three-dimensional object on its own, i.e., without having to be mixed or combined with any other substance.

Herein throughout, the phrase "uncured building material" collectively describes the materials that are dispensed during the fabrication process so as to sequentially form the layers, as described herein. This phrase encompasses uncured materials (also referred to herein as building material formulation(s)) dispensed so as to form the printed object, namely, one or more uncured modeling material formulation(s), and uncured materials dispensed so as to form the support, namely uncured support material formulations.

Herein, the dispensed materials are also referred to collectively as "material formulations". The material formulations provide, typically when hardened (unless indicated otherwise), typically hardened upon exposure to a curing condition as defined herein (unless indicated otherwise), to form a respective material.

Herein throughout, the phrases "cured modeling material" and "hardened modeling material", which are used interchangeably, describe the part of the building material that forms a model object, as defined herein, upon exposing the dispensed building material to curing, and following removal of the support material. The cured or hardened modeling material can be a single hardened material or a mixture of two or more hardened materials, depending on the modeling material formulations used in the method, as described herein.

Herein throughout, the phrase "modeling material formulation", which is also referred to herein interchangeably as "modeling formulation", describes a part of the uncured building material, which is dispensed so as to form the model object, as described herein. The modeling formulation is an uncured modeling formulation, which, upon exposure to a curing condition, forms the final object or a part thereof.

An uncured building material can comprise one or more modeling formulations, and can be dispensed such that different parts of the model object are made upon curing different modeling formulations, and hence are made of different cured modeling materials or different mixtures of cured modeling materials.

Herein throughout, the phrase "hardened support material" is also referred to herein interchangeably as "cured support material" or simply as "support material" and describes the part of the building material that is intended to support the fabricated final object during the fabrication process, and which is removed once the process is completed and a hardened modeling material is obtained.

Herein throughout, the phrase "support material formulation", which is also referred to herein interchangeably as "support formulation" or simply as "formulation", describes a part of the uncured building material which is dispensed so as to form the support material, as described herein. The support material formulation is an uncured formulation. When a support material formulation is a curable formulation, it forms, upon exposure to a curing condition, a hardened support material.

Support materials, which can be either liquid materials or hardened, typically gel materials, are also referred to herein as sacrificial materials, which are removable after layers are dispensed and exposed to a curing energy, to thereby expose the shape of the final object.

Herein and in the art, the term "gel" describes a material, often referred to as a semi-solid material, which comprises a three-dimensional solid network, typically made of fibrous structures chemically or physically linked therebetween, and a liquid phase encaged within this network. Gels are typically characterized by a consistency of a solid (e.g., are non-fluidic), and feature relatively low Tensile strength, relatively low Shear Modulus, e.g., lower than 100 kPa, and a Shear Loss Modulus to Shear Storage modulus (tan delta, $G''/G'$) value lower than 1. Gels can be characterized as flowable when subjected to a positive pressure of at least 0.5 bar, preferably at least 1 bar, or higher, or, alternatively, as non-flowable when subject to a pressure lower than 1 bar or lower than 0.5 bar or of 0.3 bar or lower.

Currently practiced support materials typically comprise a mixture of curable and non-curable materials, and are also referred to herein as gel support material.

Currently practiced support materials are typically water miscible, or water-dispersible or water-soluble.

Herein throughout, the term "water-miscible" describes a material, which is at least partially dissolvable or dispersible in water, that is, at least 50% of the molecules move into the water upon mixture. This term encompasses the terms "water-soluble" and "water dispersible".

Herein throughout, the term "water-soluble" describes a material that when mixed with water in equal volumes or weights, a homogeneous solution is formed.

Herein throughout, the term "water-dispersible" describes a material that forms a homogeneous dispersion when mixed with water in equal volumes or weights.

Herein throughout, the phrase "dissolution rate" describes a rate at which a substance is dissolved in a liquid medium. Dissolution rate can be determined, in the context of the present embodiments, by the time needed to dissolve a certain amount of a support material. The measured time is referred to herein as "dissolution time".

The final three-dimensional object is made of the modeling material or a combination of modeling materials or modeling and support materials or modification thereof (e.g., following curing). All these operations are well-known to those skilled in the art of solid freeform fabrication.

In some exemplary embodiments of the invention an object is manufactured by dispensing one or more different modeling material formulations. When more than one modeling material formulation is used, each material formulation is optionally and preferably dispensed from a different array of nozzles (belonging to the same or distinct dispensing heads) of the AM apparatus.

In some embodiments, the dispensing head of the AM apparatus is a multi-channels dispensing head, in which case different modeling material formulations can be dispensed from two or more arrays of nozzles that are located in the same multi-channels dispensing head. In some embodiments, arrays of nozzles that dispense different modeling material formulations are located in separate dispensing heads, for example, a first array of nozzles dispensing a first modeling material formulation is located in a first dispensing head, and a second array of nozzles dispensing a second modeling material formulation is located in a second dispensing head.

In some embodiments, an array of nozzles that dispense a modeling material formulation and an array of nozzles that dispense a support material formulation are both located in the same multi-channels dispensing head. In some embodiments, an array of nozzles that dispense a modeling material formulation and an array of nozzles that dispense a support material formulation are located in separate dispensing head heads.

The material formulations are optionally and preferably deposited in layers during the same pass of the printing heads. The material formulations and combination of material formulations within the layer are selected according to the desired properties of the object.

Figure 2A:
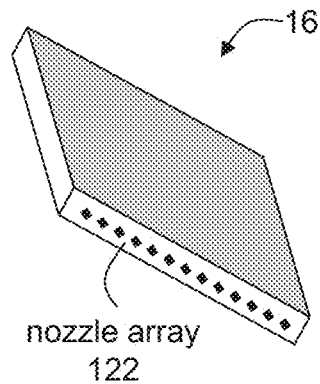
FIGS. 2A-2C are schematic illustrations of printing heads according to some embodiments of the present invention.
Figure 2B:
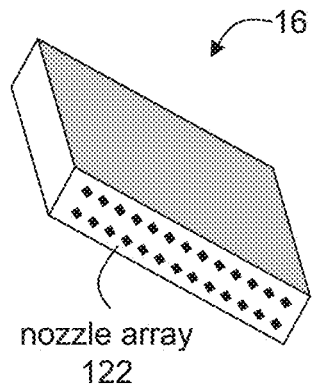
Figure 2C:
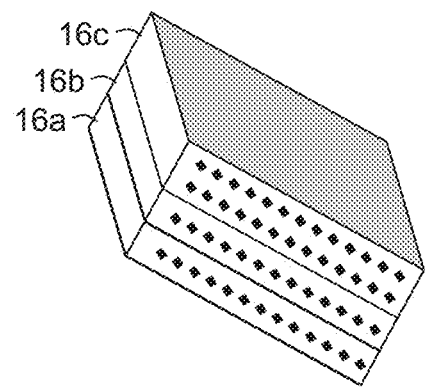

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of dispensing heads. Each head preferably comprises an array of one or more nozzles 122, as illustrated in FIGS. 2A-2C described below, through which a liquid building material formulation 124 is dispensed.

Preferably, but not obligatorily, apparatus 114 is a three-dimensional printing apparatus, in which case the dispensing heads are printing heads, and the building material formulation is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material formulation deposition apparatus.

Each dispensing head is optionally and preferably fed via a building material formulation reservoir which may optionally include a temperature control unit (e.g., a temperature sensor and/or a heating device), and a material formulation level sensor. To dispense the building material formulation, a voltage signal is applied to the dispensing heads to selectively deposit droplets of material formulation via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

Preferably, but not obligatorily, the overall number of dispensing nozzles or nozzle arrays is selected such that half of the dispensing nozzles are designated to dispense support material formulation and half of the dispensing nozzles are designated to dispense modeling material formulation, i.e. the number of nozzles jetting modeling material formulations is the same as the number of nozzles jetting support material formulation. In the representative example of FIG. 1A, four dispensing heads 16a, 16b, 16c and 16d are illustrated. Each of heads 16a, 16b, 16c and 16d has a nozzle array. In this Example, heads 16a and 16b can be designated for modeling material formulation/s and heads 16c and 16d can be designated for support material formulation. Thus, head 16a can dispense a first modeling material formulation, head 16b can dispense a second modeling material formulation and heads 16c and 16d can both dispense support material formulation. In an alternative embodiment, heads 16c and 16d, for example, may be combined in a single head having two nozzle arrays for depositing support material formulation. In a further alternative embodiment any one or more of the dispensing heads may have more than one nozzle arrays for dispensing more than one material formulation, e.g. two nozzle arrays for dispensing two different modeling material formulations or a modeling material formulation and a support material formulation, each formulation via a different array or number of nozzles.

Yet it is to be understood that it is not intended to limit the scope of the present invention and that the number of modeling material formulation depositing heads (modeling heads) and the number of support material formulation depositing heads (support heads) may differ. Generally, the number of modeling heads, the number of support heads and the number of nozzles in each respective head or head array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material formulation equals the height of support material formulation. Typical values for a are from about 0.6 to about 1.5.

As used herein the term "about" refers to ±10%.

For example, for a=1, the overall dispensing rate of support material formulation is generally the same as the overall dispensing rate of the modeling material formulation when all modeling heads and support heads operate.

In a preferred embodiment, there are M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material formulation level sensor of its own, and receives an individually controlled voltage for its operation.

Apparatus 114 can further comprise a solidifying device 324 which can include any device configured to emit light, heat or the like that may cause the deposited material formulation to hardened. For example, solidifying device 324 can comprise one or more radiation sources, which can be, for example, an ultraviolet or visible or infrared lamp, or other sources of electromagnetic radiation, or electron beam source, depending on the building material formulation being used. In some embodiments of the present invention, solidifying device 324 serves for curing or solidifying the modeling material formulation.

In some embodiments of the present invention apparatus 114 comprises cooling system 134 such as one or more fans or the like.

The dispensing head and radiation source are preferably mounted in a frame or block 128, which is preferably operative to reciprocally move over a tray 360, which serves as the working surface. In some embodiments of the present invention the radiation sources are mounted in the block such that they follow in the wake of the dispensing heads to at least partially cure or solidify the material formulations just dispensed by the dispensing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material formulation generated during leveling. Waste collection device 136 may comprise any mechanism that delivers the material formulation to a waste tank or waste cartridge.

In use, the dispensing heads of unit 16 move in a scanning direction, which is referred to herein as the X direction, and selectively dispense building material formulation in a predetermined configuration in the course of their passage over tray 360. The building material formulation typically comprises one or more types of support material formulation and one or more types of modeling material formulation. The passage of the dispensing heads of unit 16 is followed by the curing of the modeling material formulation(s) by radiation source 126. In the reverse passage of the heads, an additional dispensing of building material formulation may be carried out, according to predetermined configuration. In the forward and/or reverse passages of the dispensing heads, the materials just dispensed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 16, within the layer. Such Z displacement is carried out in order to cause contact of the leveling device with the surface in one direction and prevent contact in the other direction.

System 110 optionally and preferably comprises a building material formulation supply system 330 which comprises the building material formulation containers or cartridges and supplies a plurality of building material formulations to fabrication apparatus 114.

A controller 152 controls fabrication apparatus 114 and optionally and preferably also supply system 330. Controller 152 can be a computerized controller having an electronic circuit and a non-volatile memory medium readable by the circuit, wherein the memory medium stores program instructions which, when read by the circuit, cause the circuit to perform control operations as further detailed below. In some embodiments of the present invention, the electronic circuit of controller 152 is also configured for performing data processing operations. Controller 152 preferably communicates with a data processor 154, which transmits digital data pertaining to fabrication instructions based on computer object data, e.g., a CAD configuration represented on a computer readable medium in a form of a Standard Tessellation Language (STL) format or the like. Typically, controller 152 controls the voltage applied to each dispensing head or nozzle array and the temperature of the building material formulation in the respective printing head.

Once the manufacturing data is loaded to controller 152 it can operate without user intervention. In some embodiments, controller 152 receives additional input from the operator, e.g., using data processor 154 or using a user interface 116 communicating with unit 152. User interface 116 can be of any type known in the art, such as, but not limited to, a keyboard, a touch screen and the like. For example, controller 152 can receive, as additional input, one or more building material formulation types and/or attributes, such as, but not limited to, color, characteristic distortion and/or transition temperature, viscosity, electrical property, magnetic property. Other attributes and groups of attributes are also contemplated.

Figure 1D:
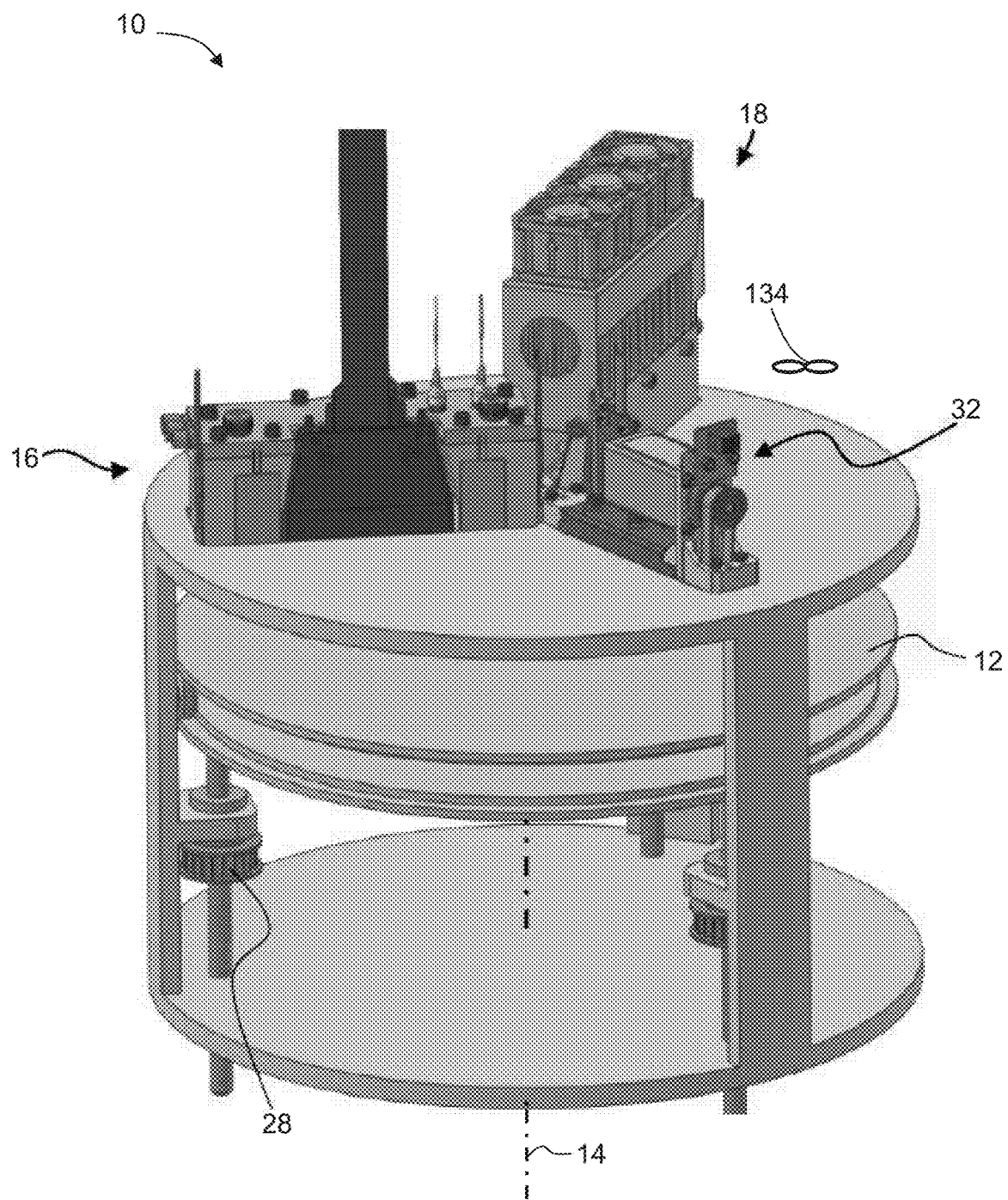

Another representative and non-limiting example of a system 10 suitable for AM of an object according to some embodiments of the present invention is illustrated in FIGS. 1B-1D. FIGS. 1B-1D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having a plurality of separated nozzles, and arranged to receive building material formulation from supply system 330. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii) Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction φ, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head, which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a supporting structure for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-2B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1-\varphi_2$, and the angle between the linear nozzle arrays of the two heads is also $\varphi_1-\varphi_2$. The particular direction along which a particular head is oriented (radially) is referred to as the "indexing direction" of the head.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a support structure 30 positioned below heads 16 such that tray 12 is between support structure 30 and heads 16. Support structure 30 may serve for preventing or reducing vibrations of tray 12 that may occur while inkjet printing heads 16 operate. In configurations in which printing heads 16 rotate about axis 14, support structure 30 preferably also rotates such that support structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, support structure 30 preferably also moves vertically together with tray 12. In configurations in which the vertical distance is varied by heads 16 along the vertical direction, while maintaining the vertical position of tray 12 fixed, support structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can has an electronic circuit and a non-volatile memory medium readable by the circuit, wherein the memory medium stores program instructions which, when read by the circuit, cause the circuit to perform control operations as further detailed below. In some embodiments of the present invention, the electronic circuit of controller 20 is also configured for performing data processing operations.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
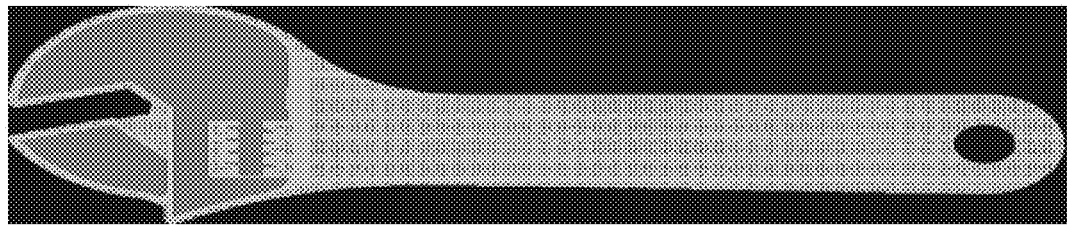
FIGS. 3A-3B are schematic illustrations demonstrating coordinate transformations according to some embodiments of the present invention.
Figure 3B:
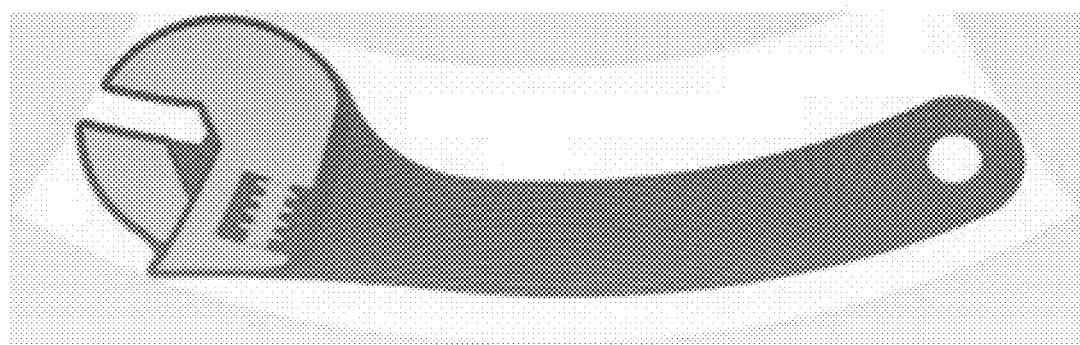

The transformation of coordinates allows three-dimensional printing over a rotating tray. In conventional three-dimensional printing, the printing heads reciprocally move above a stationary tray along straight lines. In such conventional systems, the printing resolution is the same at any point over the tray, provided the dispensing rates of the heads are uniform. Unlike conventional three-dimensional printing, not all the nozzles of the head points cover the same distance over tray 12 during at the same time. The transformation of coordinates is optionally and preferably executed so as to ensure equal amounts of excess material formulation at different radial positions. Representative examples of coordinate transformations according to some embodiments of the present invention are provided in FIGS. 3A-3B, showing a slice of an object (each slice corresponds to fabrication instructions of a different layer of the objects), where FIG. 3A illustrates the slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material formulation in layers, such as to print a three-dimensional object on tray 12.

System 10 optionally and preferably comprises hardening device 324, which may include one, or more radiation sources 18, such as, but not limited to, an ultraviolet or visible or infrared lamp, or other sources of electromagnetic radiation, or electron beam source, depending on the modeling material formulation being used. Radiation source can include any type of radiation emitting device, including, without limitation, light emitting diode (LED), digital light processing (DLP) system, resistive lamp and the like. Radiation source 18 serves for curing or solidifying the modeling material formulation. In various exemplary embodiments of the invention the operation of radiation source 18 is controlled by controller 20, which may activate and deactivate radiation source 18 and may optionally also control the amount of radiation generated by radiation source 18.

In some embodiments of the invention, system 10 further comprises one or more leveling devices 32, which can be manufactured as a roller or a blade. Leveling device 32 serves to straighten the newly dispensed materials prior to the dispensing of additional materials thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention system 10 comprises cooling system 134 (see FIGS. 1C and 1D) such as one or more fans or the like.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different material formulations from different dispensing heads. These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations is formed.

The present embodiments thus enable the deposition of a broad range of material formulation combinations, and the fabrication of an object which may consist of multiple different combinations of material formulations, in different parts of the object, according to the properties desired to characterize each part of the object.

Further details on the principles and operations of an AM system suitable for the present embodiments are found in U.S. Pat. No. 9,031,680, the contents of which are hereby incorporated by reference.

The inventors of the present invention have devised a technique that allows maintaining within the AM system a temperature that is within a predetermined range of temperatures. This is advantageous since it allows the system of the present embodiments to adapt the working temperature of the AM process based on information provided by the operator or extracted automatically.

One type of information can relate to the building material or materials to be used for the AM. Since the optimal working temperatures may differ among different types of building materials, the system of the present embodiments can adapt the working temperature based on the material or materials to be dispensed. Thus, in some embodiments of the present invention the predetermined range of temperatures is selected by the operator or automatically by the controller of the AM system, based on the materials that are to be dispensed. For example, when the materials are acrylic, relatively low temperatures (e.g., from about 60° to about 100°) are preferred, when the materials are solvent-based materials (e.g., ceramic materials, polyimide-containing materials) that require solvent drying, more elevated temperatures (e.g., from about 100° to about 150°) are preferred, and when the martials requite sintering (for example, electrically conductive materials) even higher temperatures (e.g., from about 150° to about 200°) are preferred.

Some modeling materials, particularly UV polymerizable materials, exhibit undesired deformation such as curling during the fabrication of the object. Such curling tendency was found to be the result of material shrinkage during phase transition from liquid to solid. The extent of curling is a measurable quantity. A suitable process for measuring the extent of curling can include fabrication of an object of a predetermined shape, e.g., an elongated bar having a rectangular or square cross section, on a flat and horizontal surface, applying a predetermined load on one end of the object, and measuring the elevation of the opposite end above the surface.

The extent of curling correlates with the existence of a temperature gradient in the manufactured object along the vertical direction, and also with the difference between the characteristic Heat Deflection Temperature (HDT) of the building material and the temperature within the AM system during fabrication.

As used herein, the term "Heat Deflection Temperature" (HDT) refers to a temperature at which the respective material or combination of materials deforms under a predetermined load at some certain temperature. Suitable test procedures for determining the HDT of a material or combination of materials are the ASTM D-648 series, particularly the ASTM D-648-06 and ASTM D-648-07 methods.

Without wishing to be bound to any theory, it is postulated that a temperature within the system during fabrication which is close to the HDT that the materials develop during curing, allows the materials to undergo stress relaxation or plastic deformation to a larger extent compared to a situation in which the temperature within the system is far from the HDT.

In various exemplary embodiments of the invention the predetermined range of temperatures is a range that encompasses the HDT of the materials to be dispensed by the system with a tolerance of, ±10° more preferably ±5°. This is advantageous from the standpoint of reducing the likelihood for curling, since it reduces the difference between the developed HDT and the temperature within the AM system.

Figure 4:
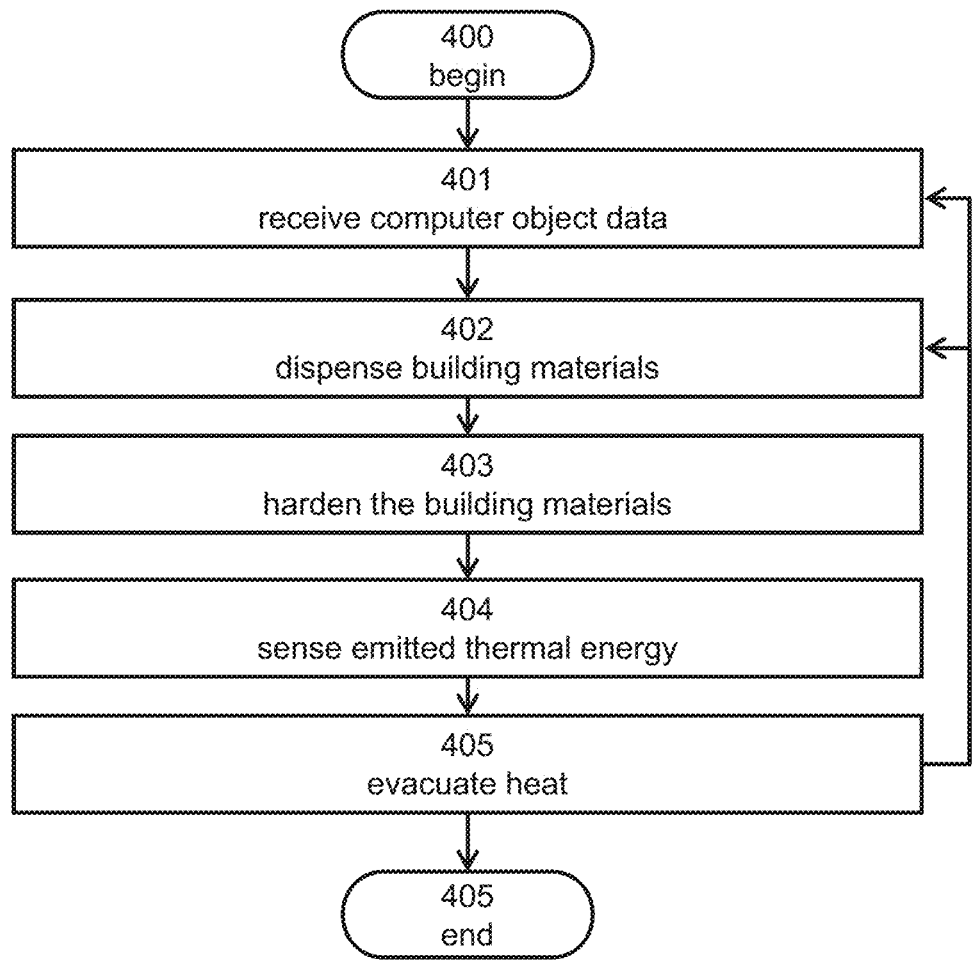
FIG. 4 is a flowchart diagram of a method suitable for additive manufacturing according to various exemplary embodiments of the present invention.

FIG. 4 is a flowchart diagram of a method suitable for additive manufacturing according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method can be executed by an AM system (e.g., system 110 or system 10) operated by a controller (e.g., controller 152 or 20). The method begins at 400 and optionally and preferably proceeds to 401 at which at which computer object data that collectively pertain to a three-dimensional shape of the object are received. The data can be received by a data processor (e.g., processor 154 or 24) operatively associated with the AM system. For example, the data processor can access a computer-readable storage medium (not shown) and retrieve the data from the medium. The data processor can also generate the data, or a portion thereof, instead of, or in addition to, retrieving data from the storage medium, for example, by means of a computer aided design (CAD) or computer aided manufacturing (CAM) software. The computer object data typically include a plurality of slice data each defining a layer of the object to be manufactured. The data processor can transfer the data, or a portion thereof, to the controller of the AM system. Typically, but not necessarily, the controller receives the data on a slice-by-slice basis. The data can be in any data format known in the art, including, any of the aforementioned computer object data formats.

The method continues to 402 at which building materials are dispensed, for example, using one or more of dispensing heads 16, on a receiving surface. The receiving surface can be the working surface of the AM system (e.g., tray 12 or 360) or it can be a previously formed layer of one or more building materials. The method continues to 403 at which the dispensed building materials are hardened to form hardened materials. Operation 403 can be executed by hardening device 324, and may include applying curing radiation to the dispensed material(s). The type of radiation (e.g., electromagnetic, electron beam, etc.) is selected based on the building materials being used. For example, for UV polymerizable materials an ultraviolet electromagnetic radiation is preferred.

The method optionally and preferably proceeds to 404 at which thermal energy emitted at least by the hardened building materials is sensed. The sensing is by a thermal sensing system schematically shown in FIGS. 1A and 1B at 138. Sensing system 138 generates sensing signals responsively to thermal energy sensed by sensor 138. Sensing system 138 typically comprises one or more thermal sensors, such as, but not limited to, one or more infrared sensors.

Preferably, sensing system 138 is mounted above the working surface (e.g., tray 12 or 360) of the AM system in a manner that allows relative motion between sensing system 138 and the working surface along the scanning direction x or the azimuthal direction cp. This allows configuring sensing system 138 to sense, locally and optionally and preferably also selectively, the energy that is emitted from a portion of the topmost layer of the object during fabrication, wherein the relative motion between sensing system 138 ensures that sensing system 138 scans the topmost layer in a serial manner to locally sense the thermal energy emitted by the layer section by section. Thus, in preferred embodiments of them invention, sensing system 138 generates a time-series of sensing signals, each signal containing local information pertaining to thermal energy emitted by a different section of the topmost layer.

Preferably, one or more of the sensors of sensing system 138 is/are mounted at a sufficient distance from hardening device 324 so as to reduce or prevent thermal energy generated by device 324 from arriving directly to the respective sensor. For example, as illustrated in FIG. 1A, sensing system 138 can be mounted on frame 128 opposite to device 324, such that head 16 is between sensing system 138 and device 324. In embodiments in which device 324 generates less heat or provide a more directional radiation (e.g., when device 324 comprises one or more LEDs) the sensing system may be mounted closer to or adjacent to the device 324, since in these embodiments there is less thermal cross talk between device 324 and system 138.

In various exemplary embodiments of the invention sensing system 138 comprises at least one pixelated sensor in which case the sensing signals generated by the respective sensor constitute a thermal map of the hardened building materials.

The advantage of the aforementioned configuration in which the sensing system 138 scans the topmost layer is that it allows using low-cost sensors to obtain thermal data at sufficiently high spatial resolution. For example, suppose that it is desired to obtain thermal data at minimal feature size of $\Delta A$ mm², and that the surface area of a particular layer is A mm². In this case it is required to have $A/\Delta A$ data samples to provide the desired resolution. It is appreciated that for small value of $\Delta A$ and large value A, the ratio $A/\Delta A$ can be rather large (e.g., 10,000 or more). A high resolution camera that provides a large number of data samples momentarily can be rather expensive and bulky. According to the present embodiments, sensing system 138 does not need to provide all $A/\Delta A$ data samples during a signal capture. By scanning the topmost layer and providing a time-series of sensing signals, the same resolution can be achieved by pixelated sensors in which the number of pixels is significantly less than $A/\Delta A$. In various exemplary embodiments of the invention the number of pixels of each pixelated sensor of sensing system 138 is less than 1,000, more preferably less than 500, more preferably less than 250, more preferably less than 125, e.g., 100 or less. For example, in experiments performed by the present inventors it was found that the aforementioned allows achieving an adequate spatial resolution using a pixelated sensor in which the sensing elements are arranged over a 4×16 array.

The angular field-of-view of sensing system 138 along the indexing and scanning direction, respectively, is preferably from about 40°×10° to about 120°×25°, more preferably from about 40°×10° to about 60°×15°. When sensing system 138 comprises one or more pixelated sensors, each sensor is preferably mounted at a distance selected such that the spatial resolution of the pixelated sensor corresponds to a minimal identifiable feature size of about 1×1 mm, more preferably 0.8×0.8 mm, more preferably 0.6×0.6 mm, more preferably 0.5×0.5 mm.

It is expected that during the life of a patent maturing from this application many relevant thermal sensors will be developed and the scope of the term thermal sensor is intended to include all such new technologies a priori.

Figure 5:
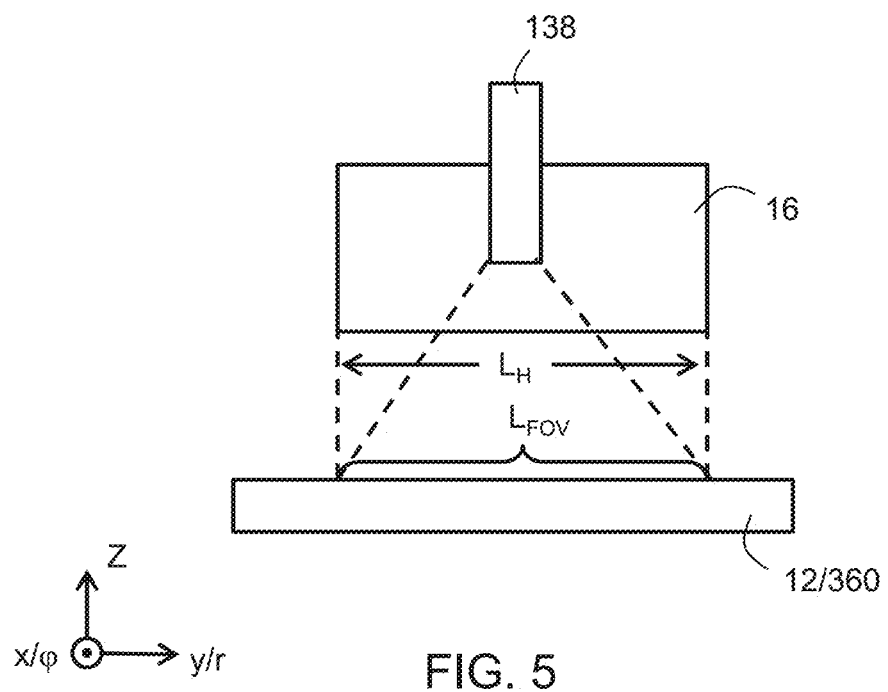
FIG. 5 is a schematic illustration of a field-of-view of a thermal sensing system, which can be employed in an AM system according to some embodiments of the present invention.

Sensing system 138 is provided with a field-of-view over the hardened materials, allowing sensing system 138 to sense thermal energy over an area of the hardened materials. In some embodiments of the present invention the field-of-view along the indexing direction matches the lengths of the nozzle array(s) of the dispensing head along the indexing direction. These embodiments are illustrated in FIG. 5, showing sensing system 138, head 16 and tray 12 or 360. While FIG. 5 shows a sensing system having a single sensor, it is to be understood that configurations in which sensing system 138 comprises a plurality of sensors is also contemplated. The lengths of the nozzle array (not shown in FIG. 5) of head 16 along the indexing direction (along direction y, in case of system 110, and along direction r in case of system 10) is denoted by $L_H$ and is defined as the distance along the indexing direction over which the nozzles (not shown in FIG. 5) are distributed. The field-of-view sensing system 138 along the indexing direction is denoted by $L_{FOV}$. Note that $L_{FOV}$ is the combined field-of-view of sensing system 138. When sensing system 138 comprises more than one sensor, the field-of-view of each individual sensor can be less than $L_{FOV}$. As illustrated, $L_H=L_{FOV}$. Thus, when sensing system 138 comprises a single sensor, the field-of-view of the signal sensor preferably equals or approximately equals $L_H$, and when sensing system 138 comprises a plurality of sensors, the field-of-view of each sensor can be less than $L_H$, but the combined field-of-view of all the sensors preferably equals or approximately equals $L_H$. For example, when there are n sensors in sensing system 138, the field-of-view of each individual sensor can be at least $L_H/n$ and less than $L_H$. Typically, the field-of-view of each individual sensor is close to but larger than $L_H/n$ to allow overlaps between field-of-views of adjacent sensors.

The field-of-view provided to sensing system 138 along the orthogonal horizontal direction (the x or φ direction) need not to be the same as the width of the head along this direction, since preferably there is relative motion between the sensor and the tray along direction x or φ.

Returning to FIG. 4, the method proceeds to 405 at which heat is evacuated away from the building materials. This can be executed by operating cooling system 134. Preferably, but not necessarily, cooling system 134 is mounted above the working surface (e.g., tray 12 or 360) of the AM system in a manner that allows relative motion between cooling system 134 and the working surface along the scanning direction x or the azimuthal direction φ. This allows cooling system 134 to evacuate the heat in a generally localized manner, wherein heat is evacuated more efficiently from regions below cooling system 134 than from regions farther from cooling system 134. During the relative motion, different regions are effectively cooled by system 134. In some embodiments of the invention, cooling system 134 is mounted on the printing block of the printing system together with sensing system 138 and one or more dispensing heads 16. For example, as illustrated in FIG. 1A, cooling system 134, sensing system 138 and dispensing heads 16 are mounted on frame 128.

The heat is evacuated at a rate that is selected responsively to the thermal energy emitted by the hardened building materials. The rate can be selected by controlling the power supplied to cooling system 134. For example, when cooling system 134 comprises one or more fans, the power is controlled to vary the rotation speed of the fan(s), hence also the heat evacuation rate. Control over the power supplied to cooling system 134 can be effected by varying any operational parameter used by system 134, including, without limitation, voltage, pulse width, pulse repetition rate, pulse width modulation, and the like. In various exemplary embodiments of the invention rate that is selected based only on the thermal energy emitted by the hardened building materials. Specifically, in these embodiments the rate of heat evacuation is not selected based on thermal energy emitted by other objects (e.g., building materials before being hardened, or other components of the system, including, without limitation, the tray or the side walls of the system). This can be ensured by operating the thermal sensor in synchronization with the dispensing heads and the motion of the tray and/or the heads. The synchronization can such that the sensing signals are sampled only after the heads dispense the material and only when the hardened material enters the field-of-view of the sensor. Such synchronization can be executed by controller 20 or 152 based on information pertaining to the state of the dispensing head and the location of the dispending head above the tray.

As a representative example for a synchronized operation, consider the configuration illustrated in FIG. 1A. In the exemplified configuration, the heads 16 are between the hardening device 324 and the sensing system 138. Consider a dispensing protocol in which the heads dispense while moving in the +x direction (to the left, in the notation of FIG. 1A), wherein during the motion in the opposite direction −x (to the right, in the notation of FIG. 1A), there is no dispensing. Suppose that the field-of-view of sensing system 138 along the y direction is as illustrated in FIG. 5, namely the same as the length of the nozzle array of head 16. During the motion in the +x direction, the head 16 dispenses building materials that are leveled by the leveling device 132 and hardened by hardening device 324. During the motion in the opposite direction, no material is dispensed, and so the uppermost layer of object 112 is hardened when sensing system 138 moves above it. When the uppermost layer enters the field-of-view of sensing system 138 while moving in the −x direction, controller 152 signals sensing system 138 to begin the sampling of the sensing signal, and when the uppermost layer exits the field-of-of sensing system 138 controller 152 signals sensing system 138 to stop the sampling. This ensures that the sensing signals contain only information pertaining to the thermal energy emitted by the hardened materials forming object 112.

As another example similar synchronization for a synchronized operation, consider a rotary system in which the tray rotates in one direction, but not in the opposite direction. For example, consider the configuration illustrated in FIG. 1B, in which the tray 12 rotates along the +φ direction. In this configuration, the material enters the field-of-view of sensing system 138 after passing below hardening device 324, and is therefore hardened. When the uppermost layer of the fabricated object enters the field-of-view of sensing system 138, controller 20 signals sensing system 138 to begin the sampling of the sensing signal, and when the uppermost layer exits the field-of-of sensing system 138 controller 20 signals sensing system 138 to stop the sampling.

Aside for the timing of the sampling to ensure that sampling occurs only during the time at which hardened materials are within the field-of-view of sensing system 138, the present embodiments also contemplate synchronizing the sampling rate of sensing system 138 with the speed of the relative motion between the sensor and the tray. This is advantageous since it reduces fluctuations in the accuracy of the sensing. Preferably, sampling rate increases linearly with the speed of the motion.

The heat evacuation rate is preferably varied dynamically in close loop with the signals from the thermal sensor to ensure that temperature of the hardened materials, preferably the hardened materials at the topmost layers of the fabricated object, are within a predetermined range of temperatures. This can be done by thresholding. Typically, when the sensed temperature is above a first predetermined threshold $T_1$, the power supplied to the cooling system 134 is increased, to ensure a higher heat evacuation rate so that the temperature does not significantly increased beyond $T_1$. Preferably, the power supplied to the cooling system 134 is decreased when the sensed temperature is below a second predetermined threshold $T_2$ ($T_2<T_1$), the power supplied to the cooling system 134 is increased, to reduce the heat evacuation rate so that the temperature does not significantly decrease below $T_2$.

In embodiments in which sensing system 138 provides a thermal map the thermal map is preferably analyzed to identify in the map a first pixel population of a higher temperature, and a second pixel population of a lower temperature. When the temperature of the first pixel population is above the threshold $T_1$, the power supplied to the cooling system 134 can be increased. Preferably, when the temperature of the second pixel population is below the threshold $T_2$, the power supplied to the cooling system 134 can be decreased.

In some embodiments of the present invention the evacuation rate is varied as a nonlinear function of the temperature difference $\Delta T$ between the sensed temperature and a predetermined reference temperature. Preferably, the nonlinear function comprises a quadratic function of $\Delta T$.

In some embodiments of the present invention the controller of the AM system controls the hardening device to harden one type of building material before dispensing another type of building material. These embodiments are particularly useful when the preferred fabrication conditions (e.g., preferred temperature ranges) of two or more of the materials used during the AM substantially differ from each other. Consider, for example, a fabrication process in which two types of materials are used, wherein the preferred temperature ranges for these two materials do not overlap. Since the temperature ranges do not overlap, the operational parameters required for operating the cooling system 134 in order to provide heat evacuation rates that maintain these temperature ranges may also differ.

Suppose that the computer object data for a particular slice is such that both materials are to be dispensed to form the same layer. In this case, one of the materials is dispensed and hardened to form a first portion of the layer, and the power of the cooling system is controlled to ensure that the temperature at the vicinity of the first portion of the layer is within the preferred range of temperatures for this material. Thereafter, the other material is dispensed and hardened to form a second portion of the layer, and the power of the cooling system is controlled to ensure that the temperature at the vicinity of the second portion of the layer is within the preferred range of temperatures for the other material. Such a procedure can ensure that both materials enjoy the preferred range of temperatures even when the ranges do not overlap.

The temperature ranges and/or operational parameters for the cooling system can be provided to AM system manually by the operator, or they can be obtained automatically. For example, a computer readable medium storing groups of building materials and corresponding operational parameters can be accessed. Each of the materials to be used in the AM process can be associated with one of the groups, and the corresponding operational parameters can be extracted.

The present embodiments additionally contemplated a procedure in which the rate of heat evacuation is selected based, at least in part, on the computer object data received at 401. In these embodiments, operation 404 can be skipped. Alternatively, the rate of heat evacuation can be selected based on both the sensing 404 and the computer object data.

In a representative exemplified embodiment, the rate of heat evacuation is varied as a decreasing function of an area of a respective layer dispensed by the dispensing head. Since larger area of hardened material allows higher heat dissipation, varying the rate of heat evacuation as a decreasing function of the area can reduce the likelihood that the temperature at the layer significantly exceeds the temperature threshold $T_1$.

In another representative exemplified embodiment, the rate of heat evacuation is selected based on the number of passes that the dispensing head performs over the receiving surface per layer. Since the number of passes correlates with the area of the layer, the rate of heat evacuation can be varied as a decreasing function of the number of passes.

From 405 the method optionally and preferably loops back to 401 or 402 to form an additional layer of the object. The loop can continue until all the layers of the object are formed. The method ends at 406.

As stated, the rate of heat evacuation is preferably controlled by the controller of the AM system. Typically the controller includes one or more circuits for performing the various operations. Although the controllers 152 and 20 are shown in FIGS. 1A and 1B as single blocks, it is to be understood that the various circuits the perform the operations can be physically attached to different components of the AM system.

Figure 6:
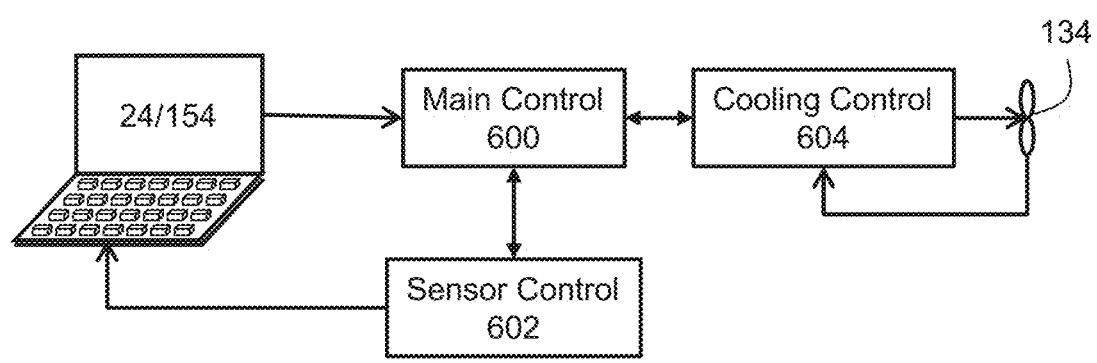
FIG. 6 is a schematic block diagram of circuits, which can be employed by a controller of an AM system according to some embodiments of the present invention.

A schematic block diagram of circuits which can be employed by the controller 20/152 according to some embodiments of the present invention are illustrated in FIG. 6. In the illustrated example, which is not to be considered as limiting, three circuit boards 600, 602, and 604 are shown. Circuit board 600 serves as the main control of the AM system, and is optionally and preferably configured to control various components of the AM system other than the thermal sensing system 138 and the cooling system 134, in response to input data received from processor 154 or 24. Thus, for example, circuit board 600 can be configured to control at least the printing heads, and the relative motion between the heads and the tray.

Circuit board 602 serves as the controller of sensing system 138 ("Sensor Control") and is configured to activate and deactivate sampling of the signals received from the sensor, and optionally and preferably also to control the sampling rate, responsively to control signals from circuit board 600 ("Main Control"). Sampled signals are transmitted by board 602 to processor 24 or 154, for processing. Alternatively, the sampled signals can be transmitted to main control board 600. Processor 24/154 or main control board 600 analyzes the signal to determine whether or not the heat evacuation rate is to be varied as further detailed hereinabove and transmits signals pertaining to the analysis to circuit board 604.

Circuit board 604 serves as a "cooling control" and is configured to control the operation of the cooling system based on the analysis performed by processor 154 or 24, e.g., by varying the operation parameter as further detailed hereinabove. Board 604 can optionally and preferably receive feedback signals from system 134. The feedback signals contain information pertaining to the operation of system 134. For example, when system 134 comprises a fan, the feedback signals can contain tachometer data describing the rotation of the fan.

Figure 7:
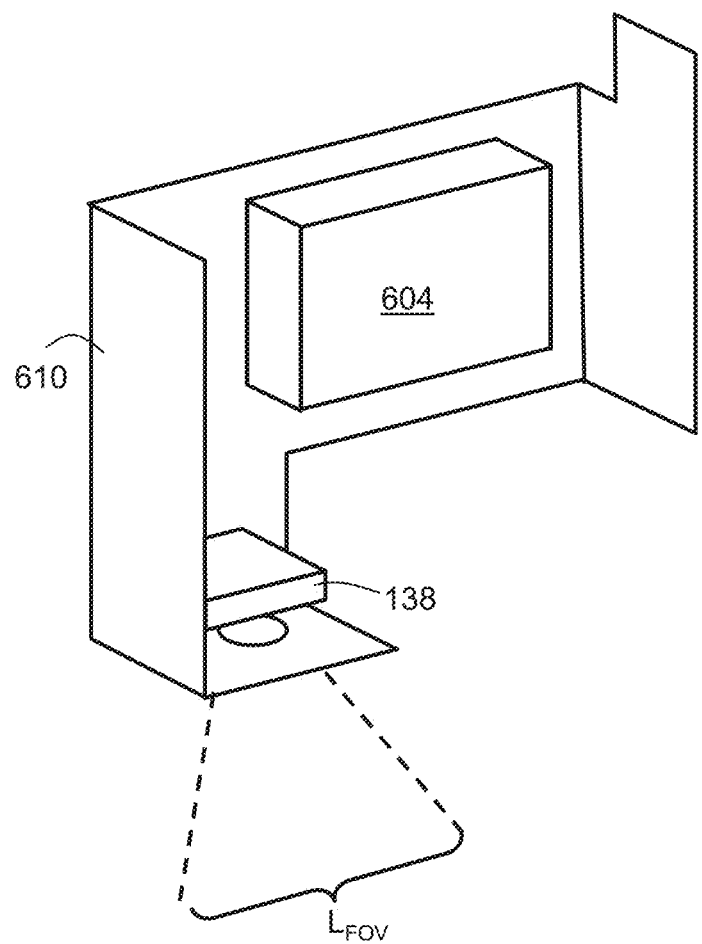
FIG. 7 is a schematic illustration of a structure suitable for holding a thermal sensor and a circuit board according to some embodiments of the present invention.

Circuit boards 600, 602, and 604 can all be arranged on the same physical board. Alternatively, one or more of boards 600, 602, and 604 can be physically separated from the others. In a preferred implementation, boards 600, 602 are arranged on the same physical board, and board 604 is separated from boards 600 and 602. In this embodiment, board 604 can be mounted on the same structure with sensing system 138. A representative and non-limiting illustration of a structure 610 suitable for holding one or more of the sensors of sensing system 138 and board 604 is shown in FIG. 7. Also shown in FIG. 7 is the field-of-view $L_{FOV}$ of sensing system 138 along the indexing direction.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Prototype System

Experiments have been conducted to investigate the ability of a prototype AM system having a thermal sensor movable relative to the tray can be stabilize the temperature of the hardened building material. In all the experiments described the cooling system included fans and the AM system was a system as schematically illustrated in FIG. 1A.

Figure 8:
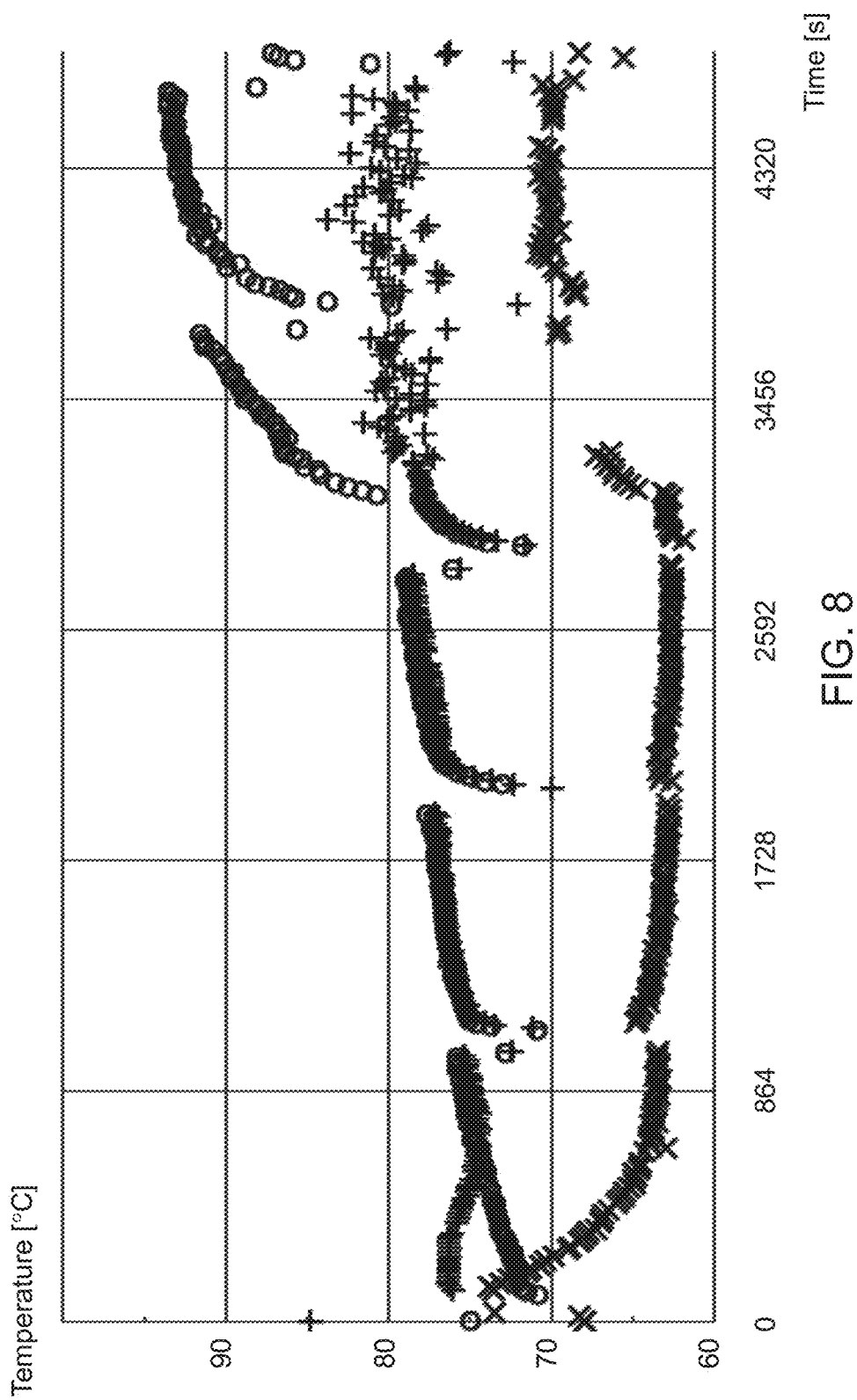
FIG. 8 is a feasibility test graph obtained in experiments performed according to some embodiments of the present invention.

FIG. 8 is a feasibility test graph showing the temperature of the layer in degrees Celsius as a function of the time in seconds, in an experiment in which dispensing in 300 DPI in the indexing direction was employed. The temperatures were measured using a static high-resolution infrared camera mounted to capture the entire layer. Shown is the temperature when the fans were constantly off (open circles), constantly on (crosses), and controlled by the controller (plus symbols). The controller was set to maintain a temperature of 75° C. As shown, the controller successfully stabilized the temperature.

Figure 9A:
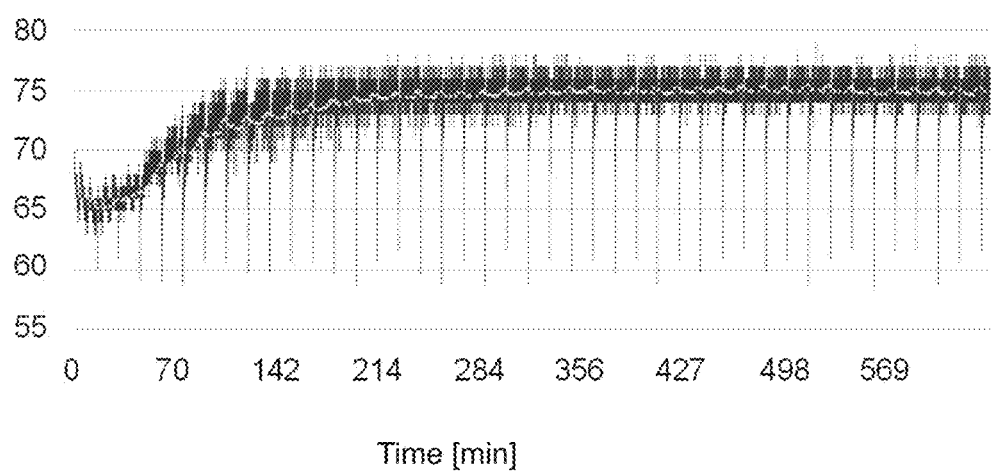
FIGS. 9A and 9B are graphs showing raw data received from a sensor in an experiment in which the sensor was moving with respect to a tray during a fabrication of a prismatic object.

FIG. 9A is a graph showing raw data (dark grey line) and filtered data (white line) received from sensing system 138, in an experiment in which sensing system 138 included a single sensor moving with respect to the tray during fabrication of a prismatic object. Shown is the temperature within the field-of-view of the sensor in degrees Celsius as a function of the time in minutes. The temperatures were measured using an infrared camera mounted to capture the entire layer. Shown is the temperature when the fans were controlled by the controller (diamonds). The controller was set to maintain a temperature of 75° C. As shown, the controller successfully stabilized the temperature.

Figure 9B:
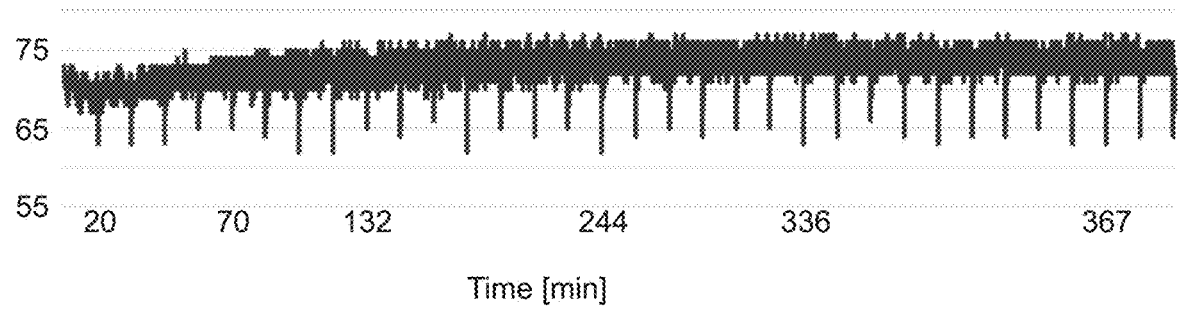

FIG. 9B is a graph showing raw data received from sensing system 138, in an experiment in which sensing system 138 included a single sensor moving with respect to the tray during fabrication of a prismatic object. Shown is the temperature within the field-of-view of the sensor in degrees Celsius as a function of the time in minutes. The temperatures were measured using an infrared camera mounted to capture the entire layer. Shown is the temperature when the fans were controlled by the controller (diamonds). The controller was set to maintain a temperature of 72° C. As shown, the controller successfully stabilized the temperature.

Figure 10A:
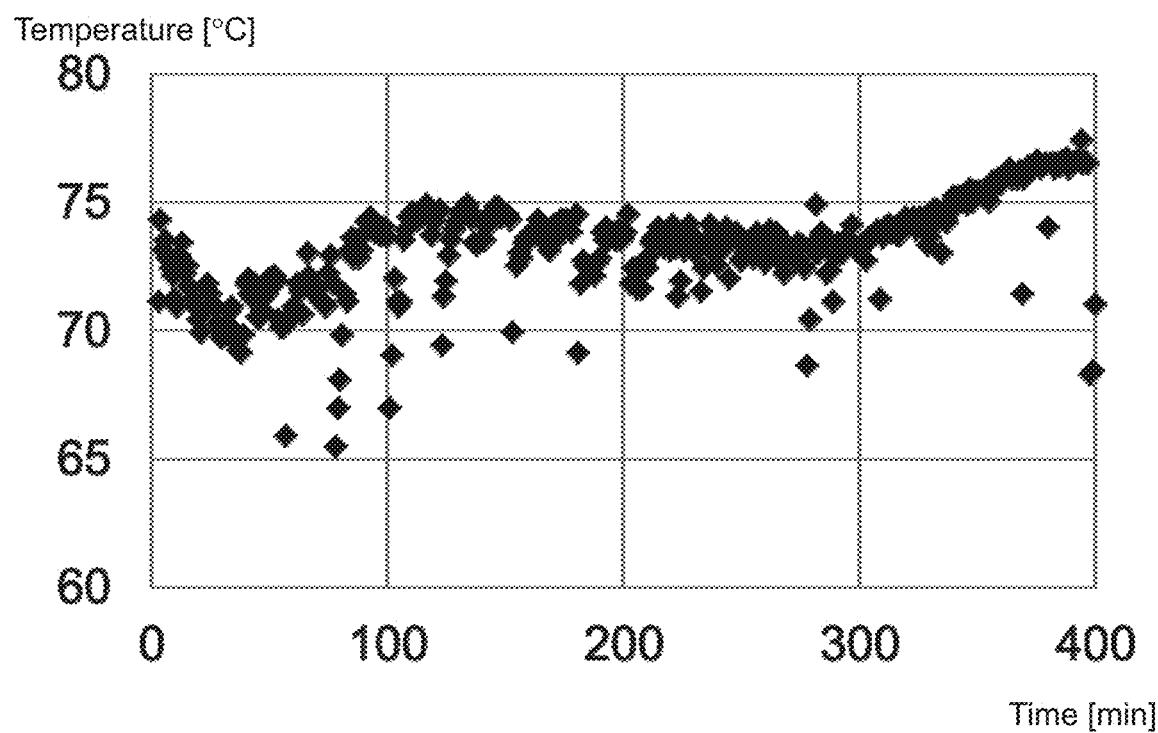
FIGS. 10A and 10B are graphs showing temperatures measured during experiments performed according to some embodiments of the present invention using a static high-resolution infrared camera mounted to capture the entire layer.
Figure 10B:
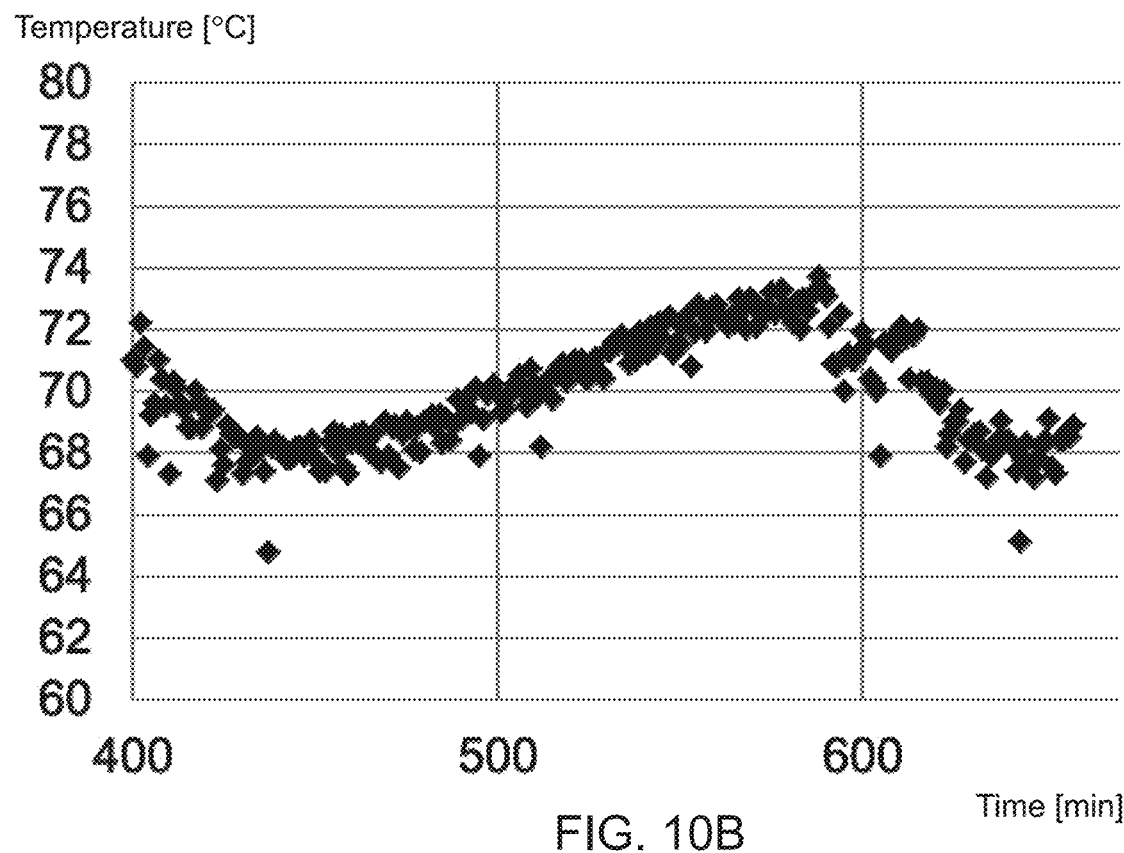

FIGS. 10A and 10B are graphs showing temperatures measured using a static high-resolution infrared camera mounted to capture the entire layer. The data correspond to experiments in which the controller was set to maintain a temperature of 75° C. (FIG. 10A) and 72° C. (FIG. 10B). As shown, the controller successfully prevents the temperature from significantly rising above the input temperature.

Figure 11A:
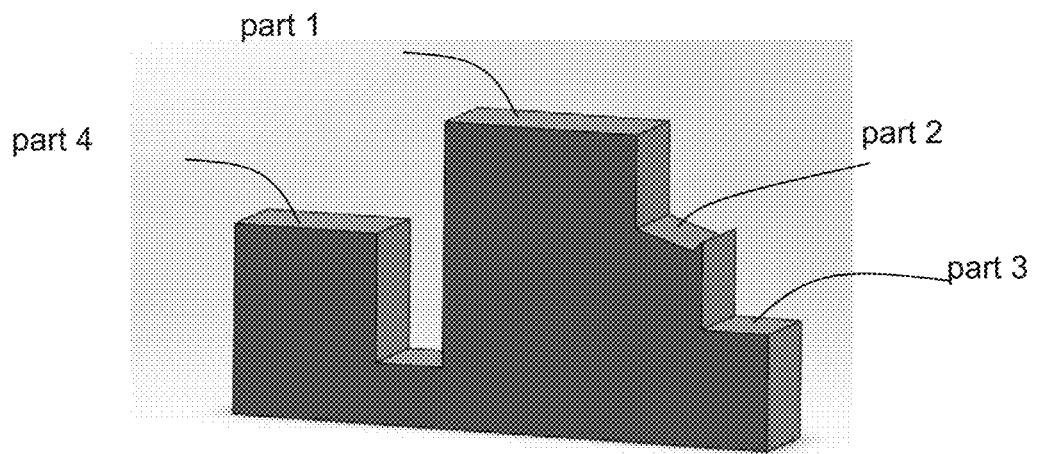
FIGS. 11A-11C are an illustration (FIG. 11A), a thermal map produced by a high-resolution infrared camera (FIG. 11B), and a graph (FIG. 11C) describing a fabrication of an object having a top surface of different heights, obtained experiments performed according to some embodiments of the present invention.
Figure 11B:
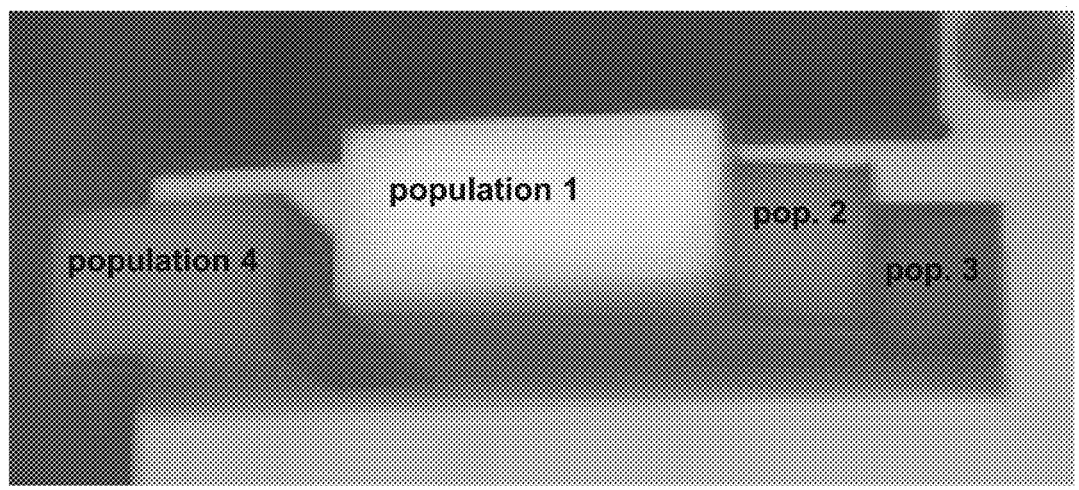
Figure 11C:
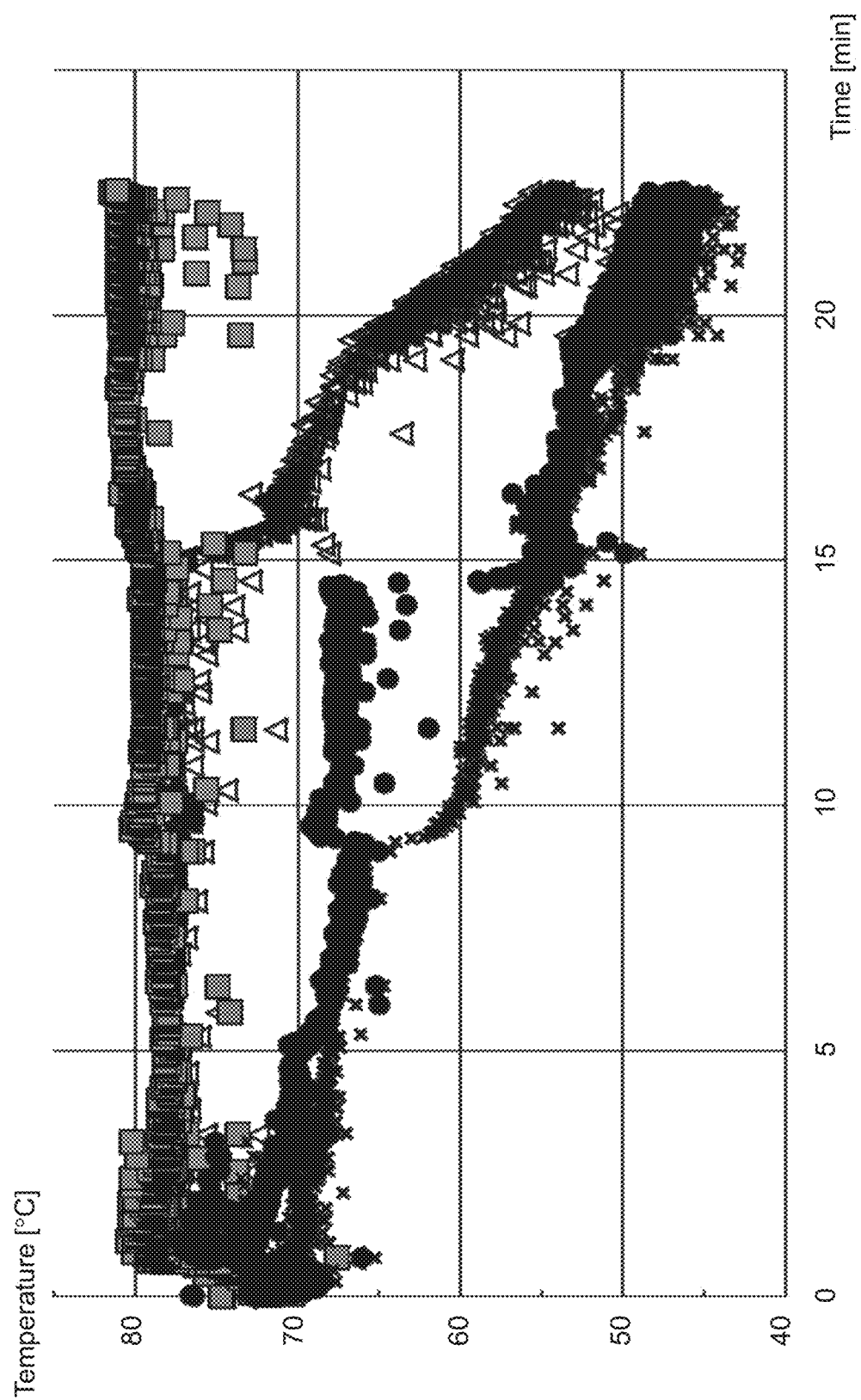

FIGS. 11A-11C are an illustration, a thermal map produced by a high-resolution infrared camera, and a graph describing a fabrication of an object having a top surface of different heights. The controller was set to maintain a temperature of less than 80° C.

Four top surfaces are marked on the illustration (FIG. 11A), each having a different high. The highest surface is marked "part 1", the next to highest surface is marked "part 2", the lowest surface is marked "part 3", and the next to lowest surface is marked "part 4". Four pixel populations are marked on the thermal map (FIG. 11B), population Nos. 1 through 4, respectively corresponding to part Nos. 1 through 4. The highest temperature is of population 1, since it is the newly formed surface. The graph (FIG. 11C) shows the temperature of each surface in degrees Celsius as a function of the time in minutes. Square symbols correspond to the temperatures of population 1, open triangle symbols correspond to the temperatures of population 2, cross symbols correspond to the temperatures of population 3, and solid circle symbols correspond to the temperatures of population 4. The controller was successfully able to identify the population with the highest temperature and to maintain its temperature at about 80° C.

Figure 12:
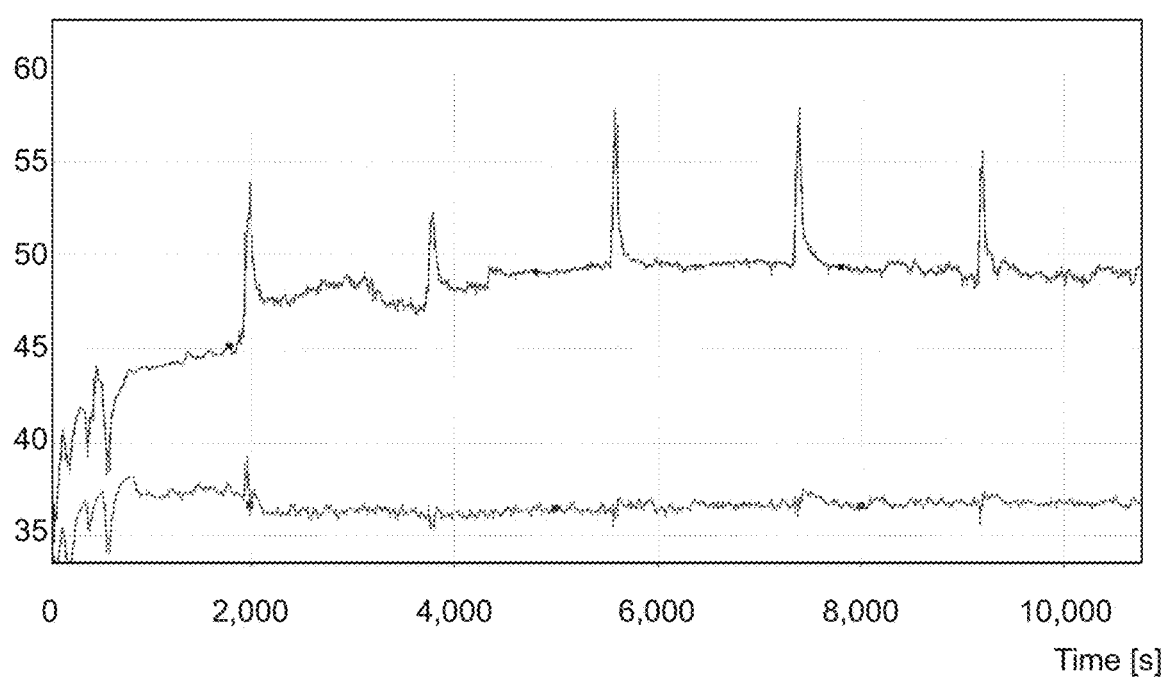
FIG. 12 is a graph showing temperature readings of a sensor in experiments in which the sensor was placed at different positions.

FIG. 12 is a graph showing the temperature readings of sensing system 138 in degrees Celsius as a function of the time in seconds, in an experiment in which sensing system 138 was placed between head 16 and hardening device 324 (upper curve), and the temperature readings of sensing system 138 in an experiment in which sensor 138 when head 16 was between sensing system 138 and hardening device 324 (lower curve), demonstrating that reading errors are significantly reduced when the sensor is farther from the hardening device. In both experiments, sensing system 138 included a single sensor. In this example, the hardening system included a mercury lamp that generated high temperature cross-talk with the sensing system. It is envisioned that the use of LED or cooler hardening system, may reduce the crosstalk, in which case the sensing system may be mounted closer to or adjacent to the hardening system.

Example 2

Additional Consideration

This example describes a computerized controller that facilitates additive manufacturing (e.g., inkjet printing) of objects from building materials that require different manufacturing conditions. Some of the materials are based on solvents (e.g., ceramic, conductive and PI-based inks), other materials, such as, but not limited to, foamable, support, and standard materials (e.g., the Vero™ family of materials) are 100% reactive formulations. The solvent-based materials have different solvents (e.g., Hexyl Acetate, TGME) and different amount of solvents (e.g., 20-35 wt. %). The computerized controller of this example allows a different drying process for different solvent-based materials, for example, using an IR lamp. Other materials, e.g., electrically conductive inks, are sintered in addition to the drying operation, and the computerized controller of this example also facilitates the sintering operation. The fully reactive formulations, such as, but not limited to, support materials and Vero™ family of materials, are heat sensitive.

It was found by the inventors that the manufacturing conditions that are suitable for different types of materials do not match, and may even contradict each other.

Since different building material may have different rheological properties, the computerized controller of this example allows dispensing different building materials at different jetting conditions, wherein the jetting conditions include, without limitation, jetting temperature, pulse shape, and pulse width. Optionally and preferably the computerized controller of this example allows applying different hardening (e.g., curing), drying and/or sintering conditions for different building materials.

In some embodiments of the present invention, a computer readable medium can include a list of building materials that are classified into groups of materials. An example list of building materials is provided in Table 1, below.

TABLE 1

| Material | Process temperature | Remarks |
|---|---|---|
| Acrylic material (Vero, Agilus ™, Support) | 60 C.-100 C. | At higher temperature the jetted material may start to evaporate and the weight loss becomes significant |
| Materials which require solvent drying | 100 C.-150 C. | A fast-drying process may cause pitting and cracks in the printed layer |
| Sintering | 150 C.-200 C. | A higher temperature may damage the other model materials |

The AM system of the present embodiments can optionally and preferably comprise a heating system, such as, but not limited to, an IR lamp, and the computerized controller optionally and preferably controls the heating system, in terms of at least one of the power and exposure time. The heating system can have several functionalities: (1) to heat the substrate to the required set point prior to dispensing, and (2) to heat the dispensed materials for curing, drying and/or sintering. The heating system can be enacted by the hardening device of the AM system, or it can be provided in addition to the hardening device.

In some embodiments of the present invention, ultraviolet radiation is used for curing photoreactive components. For example, the ultraviolet radiation can be applied by LEDs. When the building material is solvent based, the computerized controller of this example optionally and preferably ensures that drying is completed before curing. For example, the computerized controller of this example can synchronize between the activation and deactivation of the ultraviolet radiation, the activation and deactivation of the heating system, and the activation and deactivation of the dispensing heads.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for additive manufacturing, comprising:
a computerized controller configured to receive computer object data arranged in slices of an object, each slice defining a layer having an area;
a dispensing head for dispensing building materials;
a hardening system for hardening said building materials to provide hardened building materials emitting thermal energy; and
a cooling system having a fan for evacuating heat away from said building materials; and
wherein said computerized controller has a circuit for controlling said dispensing head to dispense said building materials in layers based on said computer object data, said hardening system to harden said building materials, and said cooling system to evacuate heat away from said layers, wherein said circuit is configured to vary a rotating speed of said fan as a decreasing function of an area of a layer defined by a respective slice of said computer object data.

2. The system of claim 1, wherein for at least one of said layers, said dispensing head dispenses said building materials in more than one pass over a receiving surface, and wherein said circuit is configured to select said rotating speed of said fan as said decreasing function of said area of said respective layer based on a number of said passes.

3. The system according claim 1, wherein for at least one of said layers, said circuit is configured to control said hardening system to harden a portion of said layer following a dispensing of one type of building material to form said portion before a dispensing of another type of building material to form another portion of said layer.

4. The system according to claim 1, wherein said circuit is configured to access a computer readable medium storing groups of building materials, to associate a respective building material with one of said groups, and to select said rotating speed as said decreasing function of said area of said respective layer based on said association.

5. The system according to claim 1, comprising a thermal sensing system configured to sense a temperature of at least one of said layers, wherein said circuit is configured to receive temperature sensing signals from said sensing system and to select said rotating speed as said decreasing function of said area of said respective layer based on said temperature sensing signals.

6. The system according to claim 1, comprising a plurality of dispensing heads wherein said circuit is configured to transmit pulsed operating signals to said dispensing heads, in a manner that pulsed operating signals of different widths are transmitted to different dispensing heads.

7. The system according to claim 6, wherein said circuit is configured to access a computer readable medium storing groups of building materials, to associate a respective building material with one of said groups, and to select a width of a respective pulsed operating signal based on said association.

8. The system according to claim 1, comprising a heating system for heating an environment surrounding said layers, wherein said circuit is configured to access a computer readable medium storing groups of building materials, to associate a respective building material with one of said groups, and to select control of at least one of a power and operation duration of said heating system based on said association.

9. The system according to claim 8, wherein said heating system comprises a heating radiation source generating heating radiation.

10. The system according to claim 8, wherein said radiation is infrared radiation.

11. The system according to claim 8, wherein said circuit is configured to synchronize operation of said heating system with operation of said hardening system.

12. The system of claim 11, wherein said synchronization is such that said operation of said hardening system is initiated after said operation of said heating system is terminated.

13. A method for additive manufacturing, comprising:
receiving by a computerized controller computer object data arranged in slices of an object, each slice defining a layer having an area; and
under a control of said controller:
dispensing building materials to form on a receiving surface a layer patterned according to a shape of a slice of said computer object data;
hardening said building materials to provide hardened building materials emitting thermal energy;
evacuating heat away from said building materials by a cooling system having a fan; and
repeating said dispensing, said hardening, and said evacuating a plurality of times, to form a plurality of layers;
wherein said evacuating comprises varying a rotating speed of said fan as a decreasing function of an area of a layer defined by a respective slice of said computer object data.

14. The method of claim 13, wherein for at least one of said layers, said dispensing comprises dispensing said building materials in more than one pass over said receiving surface, and wherein said varying said rotating speed as said decreasing function of said area of said respective layer is based on a number of said passes.

15. The method according claim 13, wherein for at least one of said layers, said hardening comprises hardening a portion of said layer following a dispensing of one type of building material to form said portion but before a dispensing of another type of building material to form another portion of said layer.

16. The method according to claim 13, comprising accessing a computer readable medium storing groups of building materials, associating a respective building material with one of said groups, wherein said varying said rotating speed as said decreasing function of said area of said respective layer based on said association.

17. The method according to claim 13, wherein said dispensing is by dispensing heads, and the method comprises transmitting pulsed operating signals to said dispensing heads, in a manner that pulsed operating signals of different widths are transmitted to different dispensing heads.

18. The method according to claim 13, comprising, for at least one of said building materials, accessing a computer readable medium storing groups of building materials, associating a respective building material with one of said groups, and heating an environment surrounding said layers based on said association.

19. The method according to claim 18, comprising synchronizing said heating with said hardening.

20. The method of claim 19, wherein said synchronization is such that said hardening system is initiated after said heating is terminated.

21. The system of claim 5, wherein said circuit is configured to receive said temperature sensing signals only when said thermal sensing system is above said building materials once hardened.

22. The method of claim 13, comprising receiving from a thermal sensing system temperature sensing signals indicating a temperature of at least one of said layers, and selecting said rotating speed as said decreasing function of said area of said respective layer based on said temperature sensing signals.

23. The method of claim 22, wherein said receiving said temperature sensing signals is executed only when said thermal sensing system is above said building materials once hardened.

* * * * *